(12) United States Patent
Friesen et al.

(10) Patent No.: US 10,367,242 B2
(45) Date of Patent: Jul. 30, 2019

(54) IMMERSIBLE GASEOUS OXIDANT CATHODE FOR ELECTROCHEMICAL CELL SYSTEM

(71) Applicant: NANTENERGY, INC., Scottsdale, AZ (US)

(72) Inventors: Cody Friesen, Fort McDowell, AZ (US); Ramkumar Krishnan, Gilbert, AZ (US); Michael Mihalka, Sun City, AZ (US); Grant Friesen, Fountain Hills, AZ (US); Andrew Goodfellow, Phoenix, AZ (US)

(73) Assignee: NANTENERGY, INC., Scottsdale, AZ (US)

( * ) Notice: Subject to any disclaimer, the term of this patent is extended or adjusted under 35 U.S.C. 154(b) by 167 days.

(21) Appl. No.: 15/650,444

(22) Filed: Jul. 14, 2017

(65) Prior Publication Data

US 2018/0034123 A1 Feb. 1, 2018

Related U.S. Application Data

(63) Continuation of application No. 15/227,145, filed on Aug. 3, 2016, now Pat. No. 9,716,300, which is a
(Continued)

(51) Int. Cl.
*H01M 12/06* (2006.01)
*H01M 12/08* (2006.01)
*H01M 4/86* (2006.01)

(52) U.S. Cl.
CPC ........... *H01M 12/065* (2013.01); *H01M 4/86* (2013.01); *H01M 12/08* (2013.01); *Y02E 60/128* (2013.01); *Y02E 60/50* (2013.01)

(58) Field of Classification Search
None
See application file for complete search history.

(56) References Cited

U.S. PATENT DOCUMENTS

| 4,049,878 | A | 9/1977 | Lindstrom |
|---|---|---|---|
| 4,246,324 | A | 1/1981 | De Nora |

(Continued)

FOREIGN PATENT DOCUMENTS

EP 0030954 A1 7/1981

OTHER PUBLICATIONS

International Preliminary Report on Patentability dated May 14, 2015 for Appln. No. PCT/US2012/062502.
(Continued)

*Primary Examiner* — Scott J. Chmielecki
(74) *Attorney, Agent, or Firm* — Pillsbury Winthrop Shaw Pittman, LLP

(57) ABSTRACT

An electrochemical cell system is configured to utilize an oxidant reduction electrode module containing an oxidant reduction electrode mounted to a housing to form a gaseous oxidant space therein that is immersed into the ionically conductive medium. A fuel electrode is spaced from the oxidant reduction electrode, such that the ionically conductive medium may conduct ions between the fuel and oxidant reduction electrodes to support electrochemical reactions at the fuel and oxidant reduction electrodes. A gaseous oxidant channel extending through the gaseous oxidant space provides a supply of oxidant to the oxidant reduction electrode, such that the fuel electrode and the oxidant reduction electrode are configured to, during discharge, oxidize the metal fuel at the fuel electrode and reduce the oxidant at the oxidant reduction electrode, to generate a discharge potential difference therebetween for application to a load.

23 Claims, 17 Drawing Sheets

Related U.S. Application Data continuation of application No. 13/531,962, filed on Jun. 25, 2012, now Pat. No. 9,444,105.

(60) Provisional application No. 61/555,952, filed on Nov. 4, 2011.

(56) References Cited

U.S. PATENT DOCUMENTS

| | | | |
|---|---|---|---|
| 4,950,561 A | 8/1990 | Niksa et al. | |
| 5,011,747 A | 4/1991 | Strong et al. | |
| 5,447,805 A | 9/1995 | Harats et al. | |
| 5,733,384 A | 3/1998 | Cao et al. | |
| 8,168,337 B2 | 5/2012 | Friesen et al. | |
| 8,309,259 B2 | 11/2012 | Friesen et al. | |
| 2002/0061427 A1* | 5/2002 | Vu | H01M 6/5038 |
| | | | 429/406 |
| 2002/0142203 A1 | 10/2002 | Ma et al. | |
| 2002/0160247 A1* | 10/2002 | Tzeng | H01M 2/14 |
| | | | 429/405 |
| 2004/0031143 A1* | 2/2004 | Morris | H01M 2/0207 |
| | | | 29/623.4 |
| 2005/0048351 A1 | 3/2005 | Hood | |
| 2005/0123815 A1* | 6/2005 | Tsai | H01M 2/367 |
| | | | 429/404 |
| 2010/0119895 A1 | 5/2010 | Friesen et al. | |
| 2010/0119919 A1 | 5/2010 | Iarochenko et al. | |
| 2010/0285375 A1 | 11/2010 | Friesen et al. | |
| 2010/0316935 A1 | 12/2010 | Friesen et al. | |
| 2011/0070506 A1 | 3/2011 | Friesen et al. | |
| 2011/0086278 A1 | 4/2011 | Friesen et al. | |
| 2011/0200893 A1 | 8/2011 | Friesen et al. | |
| 2011/0250512 A1 | 10/2011 | Friesen et al. | |
| 2011/0316485 A1 | 12/2011 | Krishnan et al. | |
| 2012/0015264 A1 | 1/2012 | Friesen et al. | |
| 2012/0068667 A1 | 3/2012 | Friesen et al. | |
| 2012/0139496 A1 | 6/2012 | Krishnan et al. | |
| 2012/0202127 A1 | 8/2012 | Friesen et al. | |

OTHER PUBLICATIONS

International Search Report/Written Opinion dated Jan. 24, 2013 PCT/US2012/062502.
Extended European Search Report dated Oct. 12, 2018 issued in EP Application No. 18189034.4.

* cited by examiner

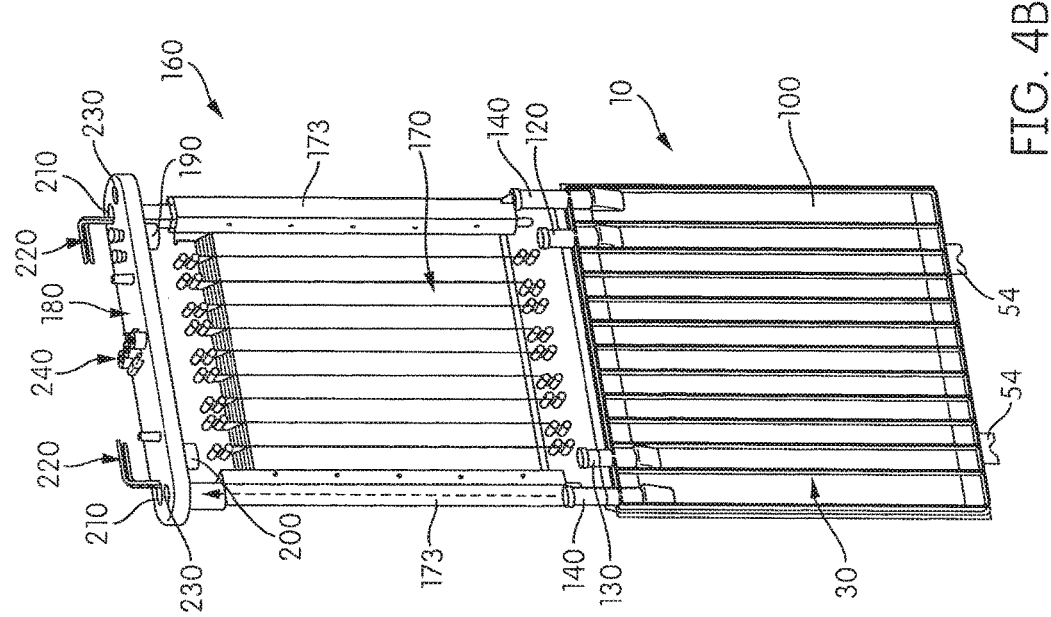
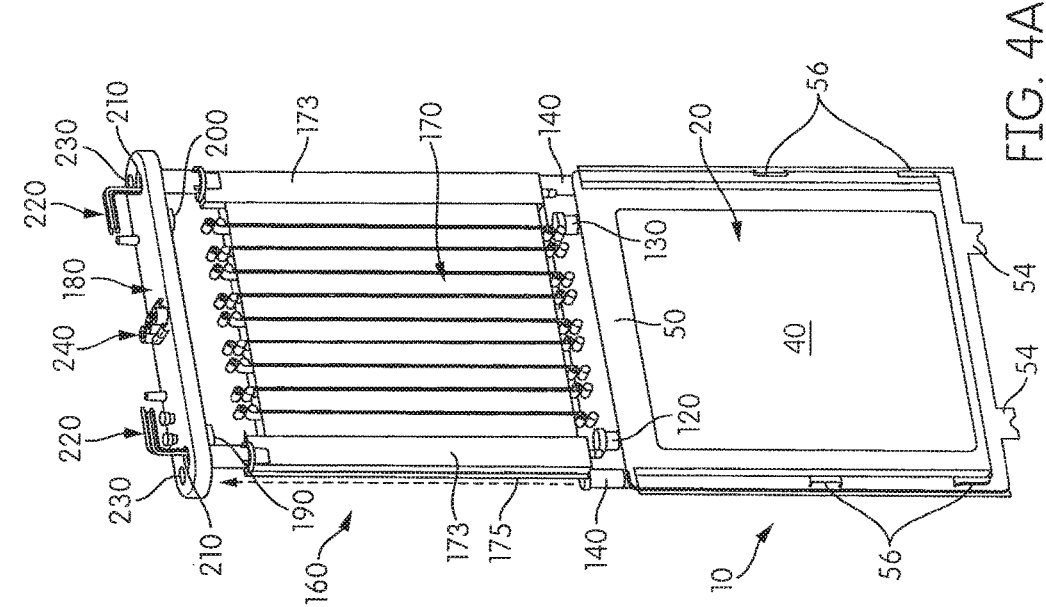

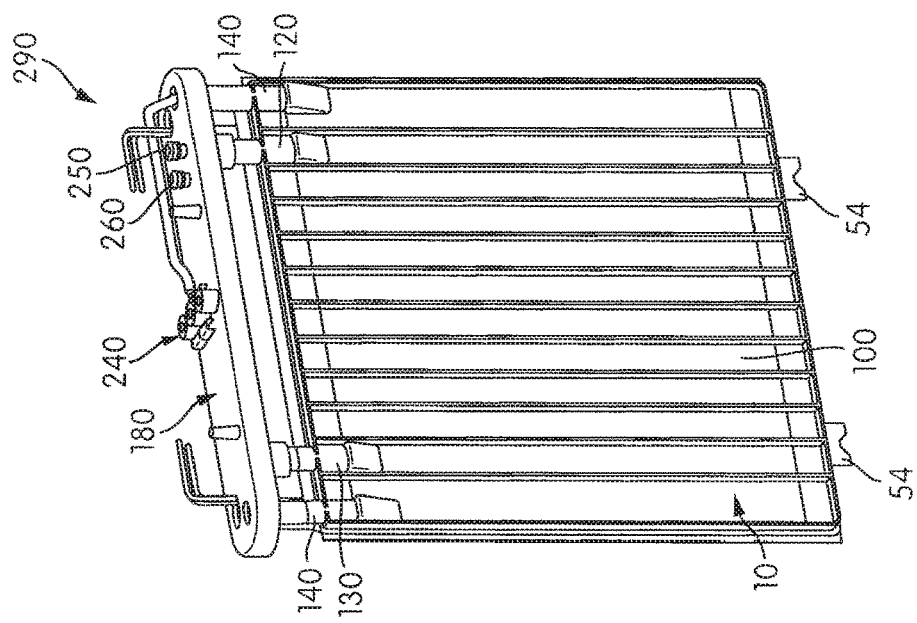
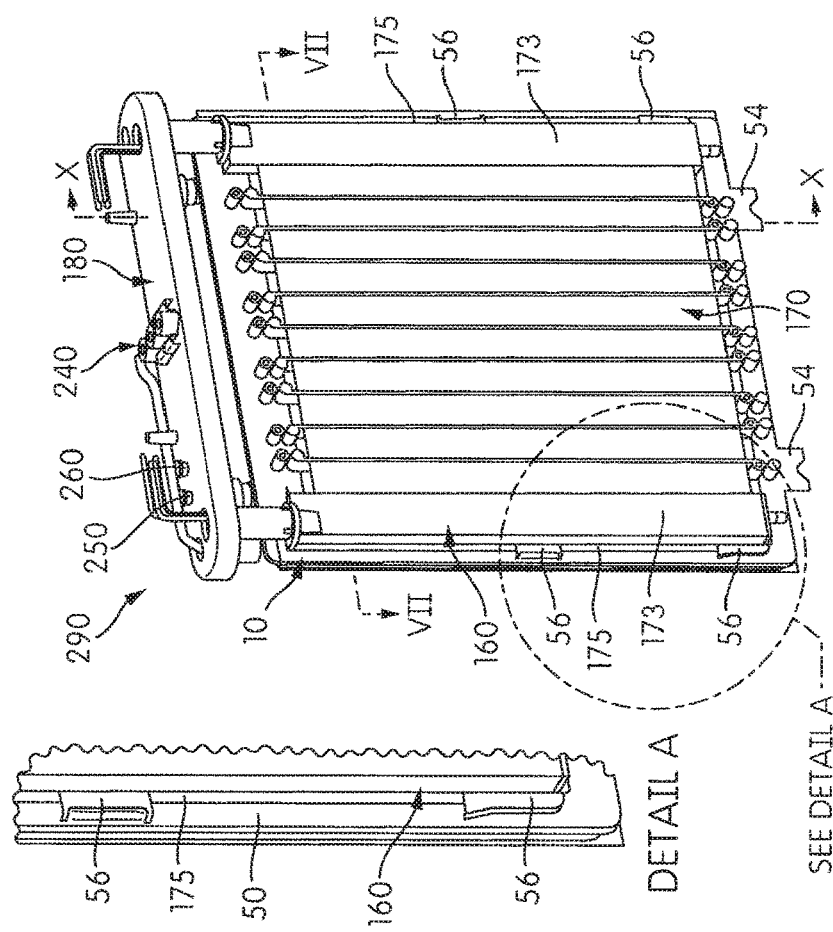

IMMERSIBLE GASEOUS OXIDANT CATHODE FOR ELECTROCHEMICAL CELL SYSTEM

This application is a continuation of U.S. application Ser. No. 15/227,145 filed Aug. 3, 2016, which is a continuation of U.S. application Ser. No. 13/531,962, filed Jun. 25, 2012, now U.S. Pat. No. 9,444,105, which claims the benefit and priority to U.S. Provisional Patent Application No. 61/555,952, filed on Nov. 4, 2011, the entire contents of all applications are incorporated herein by reference in their entirety.

FIELD

The present invention is generally related to an electrochemical cell system, and more particularly to an electrochemical cell system utilizing a gaseous oxidant reduction electrode and a liquid ionically conductive medium, such as an electrolyte.

BACKGROUND

Many types of electrochemical cells utilize an ionically conductive medium to support electrochemical reactions within the cell. For example, a metal-air electrochemical cell system may comprise one or more cells, each having a fuel electrode serving as an anode at which metal fuel is oxidized, and an air breathing cathode at which oxygen from ambient air is reduced. Such cells may also comprise an ionically conductive medium, such as a liquid electrolyte solution, to communicate the oxidized/reduced ions between the electrodes. For example, see U.S. Patent Publication No. 2009/0284229, incorporated in its entirety herein by reference. In some electrochemical cell systems comprising a plurality of electrochemical cells, the ionically conductive medium may be shared by multiple cells. For example, the liquid electrolyte solution may flow in series from one cell to another, such as is described in U.S. patent application Ser. No. 12/631,484, incorporated herein in its entirety by reference. In other electrochemical cell systems, the ionically conductive medium may be shared by multiple cells, but may flow partially in parallel. In still other electrochemical cell systems, the ionically conductive medium might not flow at all, but may instead be stagnant, or merely be agitated within a confined area between the electrodes.

Regardless of any movement of the ionically conductive medium, in conventional systems utilizing an air electrode, the air electrode defines a boundary wall for confining the ionically conductive medium within the electrochemical cell system. This is to say that the air electrode is typically sealed to the exterior of the housing, forming an ionically conductive medium impermeable barrier. A drawback to such conventional systems, however, is that if the seal between the air electrode and the housing were to fail, or if a leak were to form in the air electrode itself, a liquid ionically conductive medium would no longer be confined within the electrochemical cell, which may result in complete failure of the cell, the need to replace the ionically conductive medium, harm to the environment around the electrochemical cell, and so on. Also, in most designs, replacement of the air electrode is a difficult task, as the ionically conductive medium must be drained so that the used gaseous oxidant reduction electrode can be removed. It may therefore be appreciated that immersing the air electrode, along with a housing forming air space therein, into the ionically conductive medium may prevent the such complete failures, and may simplify replacements of air electrodes. An example of a conventional immersible air electrode is shown, for example, in U.S. Pat. No. 5,011,747, incorporated in its entirety herein by reference.

SUMMARY

According to an embodiment, an oxidant reduction electrode module configured for immersion into an ionically conductive medium of an electrochemical cell includes a housing configured to define a gaseous oxidant receiving space therein. The oxidant reduction electrode module also includes an oxidant reduction electrode having an oxidant facing side and an ionically conductive medium facing side. The oxidant reduction electrode is mounted to said housing such that the oxidant reduction electrode defines a boundary wall for the gaseous oxidant receiving space, with the oxidant facing side facing inwardly to the gaseous oxidant receiving space and the ionically conductive medium facing side facing outwardly for exposure to the ionically conductive medium. The oxidant reduction electrode module also includes a gaseous oxidant inlet and a gaseous oxidant outlet coupled by a gaseous oxidant channel extending through the gaseous oxidant receiving space. The oxidant reduction electrode module further includes one or more support members positioned within the gaseous oxidant receiving space, configured to prevent deformation of the oxidant reduction electrode into the gaseous oxidant receiving space when the oxidant reduction electrode is immersed into the ionically conductive medium, and direct a flow of gaseous oxidant within the gaseous oxidant channel from the gaseous oxidant inlet to the gaseous oxidant outlet. Additionally, an oxidant is allowed into the gaseous oxidant receiving space via the gaseous oxidant inlet, such that the oxidant reduction electrode is configured to absorb the gaseous oxidant via the oxidant facing side and reduce the gaseous oxidant during discharge of the electrochemical cell.

According to another embodiment an electrochemical cell system includes a chamber configured to contain a quantity of ionically conductive medium therein, one or more fuel electrodes, each comprising a metal fuel and configured to be contacted by the ionically conductive medium, and one or more oxidant reduction electrode modules immersed into the ionically conductive medium. Each oxidant reduction electrode module includes a housing configured to define a gaseous oxidant space therein. Each oxidant reduction electrode module also includes an oxidant reduction electrode having an oxidant facing side and an ionically conductive medium facing side, the oxidant reduction electrode mounted to said housing such that the oxidant reduction electrode defines a boundary wall for the gaseous oxidant space, with the oxidant facing side facing inwardly to the gaseous oxidant space and the ionically conductive medium facing side facing outwardly for exposure to the ionically conductive medium. Each oxidant reduction electrode module also includes a gaseous oxidant inlet and a gaseous oxidant outlet coupled by a gaseous oxidant channel extending through the gaseous oxidant space, configured to allow a flow of oxidant to the oxidant facing side of the oxidant reduction electrodes. Additionally, each oxidant reduction electrode module further includes one or more support members positioned within the gaseous oxidant space, configured to prevent deformation of the oxidant reduction electrode into the gaseous oxidant space when the oxidant reduction electrode is immersed into the ionically conductive medium, and direct a flow of gaseous oxidant within the gaseous oxidant channel from the gaseous oxidant inlet to the gaseous oxidant outlet. One or more electrochemical cells are defined by each fuel electrode and at least one associated oxidant reduction electrode. Each of the one or more electrochemical cells are configured to, during discharge, oxidize the metal fuel at the fuel electrode and reduce the gaseous oxidant at the at least one associated oxidant reduction electrode to generate a discharge potential difference therebetween for application to a load.

According to another embodiment, a method of assembling an oxidant reduction electrode module configured for immersion into an ionically conductive medium of an electrochemical cell includes providing a housing coupled to a gaseous oxidant inlet and a gaseous oxidant outlet, wherein an interior of the housing defines a gaseous oxidant space. The method also includes providing one or more support members within the gaseous oxidant space, configured to form a gaseous oxidant channel to direct a flow of gaseous oxidant between the gaseous oxidant inlet and the gaseous oxidant outlet. The method further includes sealing an oxidant reduction electrode to the housing, such that an oxidant facing side of the oxidant reduction electrode faces inwardly into the gaseous oxidant space and defines a boundary wall for the gaseous oxidant space, and an ionically conductive medium facing side of the oxidant reduction electrode faces outwardly for exposure to the ionically conductive medium when the oxidant reduction electrode module is immersed therein. When immersed in the ionically conductive medium, the assembly of the housing and the oxidant reduction electrode prevents flow of the ionically conductive medium into the gaseous oxidant space. Also, the one or more support members are configured to prevent deformation of the oxidant reduction electrode into the gaseous oxidant space when the oxidant reduction electrode is immersed into the ionically conductive medium. Additionally, the gaseous oxidant inlet permits the flow of gaseous oxidant into the gaseous oxidant space.

According to another embodiment, a method of assembling an electrochemical cell includes providing a chamber configured to contain a quantity of ionically conductive medium therein. The method also includes immersing, within the quantity of ionically conductive medium (i) an immersible oxidant reduction electrode module configured to maintain a gaseous oxidant space bounded by a housing and an oxidant facing side of an oxidant reduction electrode, the gaseous oxidant space coupled to a gaseous oxidant inlet and a gaseous oxidant outlet. Also immersed within the quantity of ionically conductive medium is (ii) a fuel electrode comprising a metal fuel and configured to be contacted by the ionically conductive medium. The method additionally includes receiving gaseous oxidant into the gaseous oxidant space via the gaseous oxidant inlet. One or more support members are provided in the gaseous oxidant space, configured to prevent deformation of the oxidant reduction electrode into the gaseous oxidant receiving space when the oxidant reduction electrode is immersed into the ionically conductive medium, while defining a gaseous oxidant channel configured to direct a flow of gaseous oxidant between the gaseous oxidant inlet and the gaseous oxidant outlet. Also, an ionically conductive medium facing side of the oxidant reduction electrode faces the fuel electrode and is exposed to the ionically conductive medium, such that the ionically conductive medium may conduct ions between the fuel and oxidant reduction electrodes to support electrochemical reactions at the fuel and oxidant reduction electrodes. Additionally, the fuel electrode and oxidant reduction electrode are configured to, during discharge, oxidize the metal fuel at the fuel electrode and reduce the gaseous oxidant at the oxidant reduction electrode to generate a discharge potential difference therebetween for application to a load.

Other embodiments will become apparent from the following detailed description, the accompanying drawings, and the appended claims.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 4A and 4B illustrate opposing perspective views of the oxidant reduction electrode module aligned for engagement to a fuel electrode module having a cell cover and a fuel electrode to form a cell assembly;

FIGS. 6a and 6b illustrate opposing perspective views of the cell assembly showing engagement of the fuel electrode module and the oxidant reduction electrode module;

DETAILED DESCRIPTION

Figure 1:
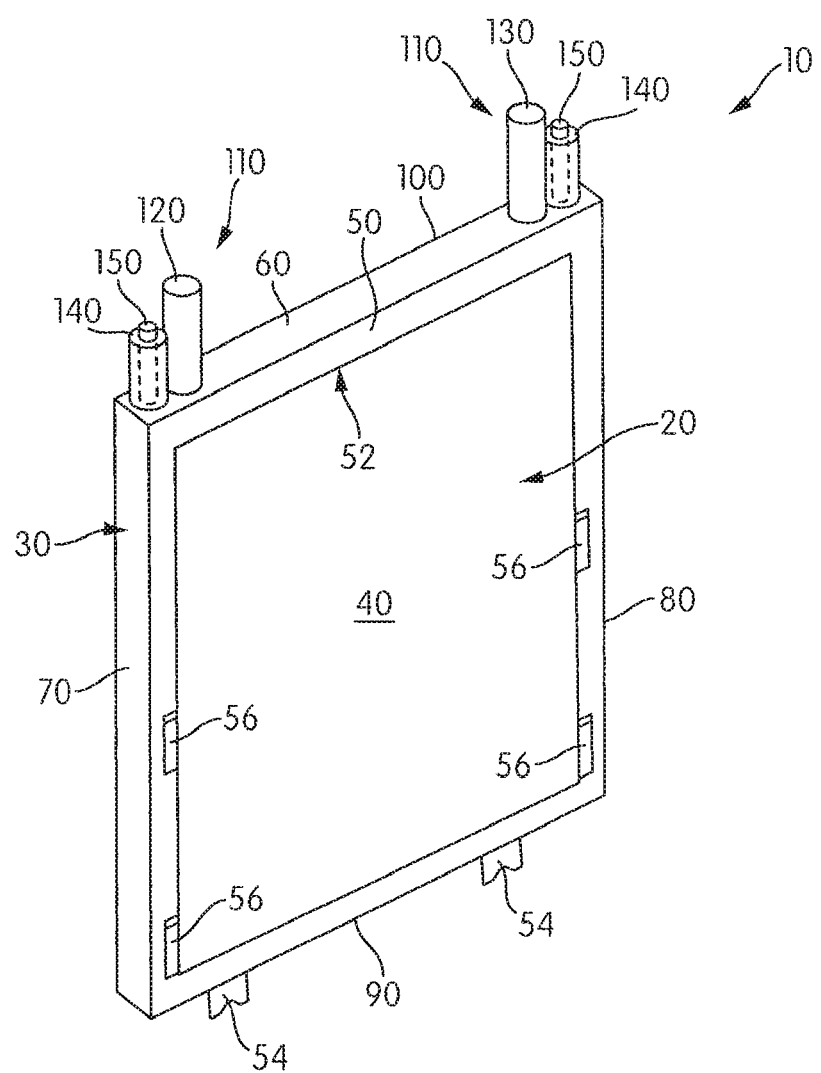
FIG. 1 illustrates a front perspective view of an embodiment of an immersible oxidant reduction electrode module housing an oxidant reduction electrode for immersion into an ionically conductive medium.

FIG. 1 illustrates a front perspective view of an oxidant reduction electrode module 10 configured for immersion into a liquid ionically conductive medium of an electrochemical cell. The oxidant reduction electrode module 10 includes an oxidant reduction electrode 20 mounted to a housing 30. The oxidant reduction electrode 20 may be of any suitable construction or configuration, having an ionically conductive medium facing side 40, and an oxidant facing side (obscured in FIG. 1, however identified as oxidant facing side 45 in FIG. 2). In an embodiment, the oxidant reduction electrode 20 may comprise a catalyst, a current collector, a hydrophobic membrane, and/or other materials that provide for reduction of a gaseous oxidant (e.g., oxygen or chlorine in ambient gaseous oxidant) to create a potential difference between the oxidant reduction electrode 20 and a fuel electrode when the cell is connected to a load L, as discussed below.

As shown, the housing 30 is configured to form a gaseous oxidant space that allows for the oxidant to flow to the oxidant facing side of the oxidant reduction electrode 20 when the oxidant reduction electrode module 10 is immersed into the ionically conductive medium. As such, the oxidant reduction electrode 20 will generally be gaseous oxidant permeable, but generally liquid impermeable, so as to prevent the ionically conductive medium from filling the gaseous oxidant space. In this context, liquid impermeable need not be a perfect barrier preventing flow of ionically conductive medium therethrough, but may otherwise be configured so that such seepage is negligible and does not significantly impact the presence or flow of gaseous oxidant in the gaseous oxidant space that allows oxidant to reach the oxidant facing side of the oxidant reduction electrode 20. In some embodiments, the oxidant reduction electrode 20 might be generally gaseous oxidant permeable, but generally ionically conductive medium impermeable, dependant upon whichever ionically conductive medium will be utilized in the electrochemical cell.

In some nonlimiting embodiments, the oxidant reduction electrode 20 may contain a fluoropolymer material, such as polytetrafluoroethylene (also known as PTFE, or Teflon®), which in some embodiments may be thermo-mechanically expanded (also known as ePTFE, or Gore-Tex®), or any other hydrophobic material. In some embodiments, the oxidant reduction electrode 20 may comprise a porous material, wherein each of the pores is significantly smaller than the size of a droplet of the ionically conductive medium, to make the material liquid impermeable. In an embodiment, reinforcing layers may be configured to prevent excessive deformation of the PTFE from the fluid pressure of the ionically conductive medium when the oxidant reduction electrode module 10 is immersed, such as is disclosed in U.S. Provisional Patent Application 61/556,011, entitled "External PTFE Layer Reinforcement for Oxidant Reduction Electrode," and filed Nov. 4, 2011, the entirety of which is incorporated herein by reference. In an embodiment, the oxidant reduction electrode 20 may contain a material that is coated in durable water repellant, or any other repellant coating to repel the ionically conductive medium. Likewise, the housing 30 may be of any suitable construction or configuration that would normally prevent the ionically conductive medium from leaking into the gaseous oxidant space.

In an embodiment, the housing 30 may be formed from plastic, metal, resin, or combinations thereof. Accordingly the housing 30 may be assembled in any manner, including being formed from a plurality of elements, being integrally molded, or so on. In an embodiment, the housing 30 may be shielded or otherwise spaced from the oxidant reduction electrode 20 by a liquid impermeable nonconductive spacer, so as to prevent interference with electrochemical reactions at the oxidant reduction electrode 20. In the illustrated embodiment, the housing 30 includes a mounting frame 50 that is separable from the remainder of the housing 30, and together with the oxidant reduction electrode 20 forms a front wall for the gaseous oxidant space, as described in greater detail below. In an embodiment, the mounting frame 50 may contain an aperture 52 therein through which the ionically conductive medium facing side 40 of the oxidant reduction electrode 20 faces, so that the oxidant reduction electrode 20 is exposed to both the ionically conductive medium and the oxidant in the gaseous oxidant space. In an embodiment, such as that illustrated, support tabs 54 extend from the housing 30, and may be utilized to position the oxidant reduction electrode module 10, including the oxidant reduction electrode 20 residing therein, when the oxidant reduction electrode module 10 is immersed into the ionically conductive medium, as described in greater detail below. As further shown, engagement tabs 56 may further be provided on the side of the mounting frame 50 that is adjacent to the ionically conductive medium facing side 40 of the oxidant reduction electrode 20, protruding outwards (i.e. away from the surface of mounting frame 50) so as to further position the oxidant reduction electrode module 10, additionally discussed below.

As shown in FIG. 1, the remainder of the housing 30 further demarcates the gaseous oxidant space, separating the oxidant that is free to enter therein from the ionically conductive medium that the oxidant reduction electrode module 10 is to be immersed into. In the illustrated embodiment, the housing 30 includes a top portion 60, a left portion 70, a right portion 80, a bottom portion 90, and a back portion 100. In embodiments where several pieces of the housing 30 are joined together, any appropriate sealing technique may be utilized to prevent seepage of the ionically conductive medium into the gaseous oxidant space during immersion, so as to maintain the gaseous oxidant space for use by the oxidant reduction electrode 20. Such sealing techniques may include, but are not limited to, joining by liquid impermeable glues, melting, fusing, welding, or so on. In some embodiments, a sealing material may be applied between elements of the housing 30. For example, in an embodiment wherein the housing 30 is uniformly molded except for the mounting frame 50, sealing materials including but not limited to a plastic or rubber gaskets, adhesives, epoxies, or any other appropriate sealant may be utilized to prevent the undesirable entry of ionically conductive medium into the oxidant reduction electrode module 10 at the joints. For example, such sealants may include solvent-bond sealants, single or two-part epoxies, or UV/thermally cured epoxies. In various embodiments, the sealants may comprise sealant properties similar to those marketed as Eager Polymer EP5347 epoxy and/or MagnaTac M777 epoxy.

As shown, the oxidant is free to enter the gaseous oxidant space via one or more ports 110. The ports 110 may be of any suitable construction, and in some embodiments may be integrally molded into the housing 30. As shown in the embodiment of FIG. 1, the ports 110 may comprise a gaseous oxidant inlet 120 and a gaseous oxidant outlet 130, each of which enter into the top portion 60 of housing 30. In such an upright orientation, where the oxidant reduction electrode module 10 is immersed into the ionically conductive medium such that the ports 110 are above the bottom portion 90, a failure of the oxidant reduction electrode module 10 to maintain the gaseous oxidant space therein would not result in a spillage of ionically conductive medium through the ports 110, because gravity would force the ionically conductive medium downwards away from the ports 110. There are many benefits to such an orientation. For example, regardless of the assembly of the oxidant reduction electrode module 10, in such embodiments a failure of the oxidant reduction electrode 20 (or the seals thereof coupling the oxidant reduction electrode 20 to the housing 30) would not result in spillage of the ionically conductive medium out of the electrochemical cell. Instead, the ionically conductive medium would at most fill the gaseous oxidant space, displacing the gaseous oxidant therefrom. By lifting the ruptured oxidant reduction electrode module 10 from the ionically conductive medium, the ionically conductive medium may then drain back into the quantity of ionically conductive medium that the oxidant reduction electrode module 10 was previously immersed in, significantly reducing its loss, clean-up concerns, and so on. Additionally, it may be a relatively trivial matter to replace the oxidant reduction electrode module 10 with another oxidant reduction electrode module 10, and would not otherwise require a complete draining of the ionically conductive liquid from the cell. Furthermore, in some embodiments where multiple electrochemical cells are formed by the immersion of separate oxidant reduction electrode modules 10, the failure of one oxidant reduction electrode module 10 might not affect operation of the other cells.

As further shown in FIG. 1, conductor channels 140 may additionally be provided in the oxidant reduction electrode module 10, so that electrical conductors 150 may electrically connect to the oxidant reduction electrode 20, as discussed in greater detail below. In various embodiments the conductor channels 140 may further be sealed from the ionically conductive medium, and/or may be positioned to rise above the ionically conductive medium similar to the ports 110, which again would prevent the ionically conductive medium from inadvertently seeping into the gaseous oxidant space.

Figure 2:
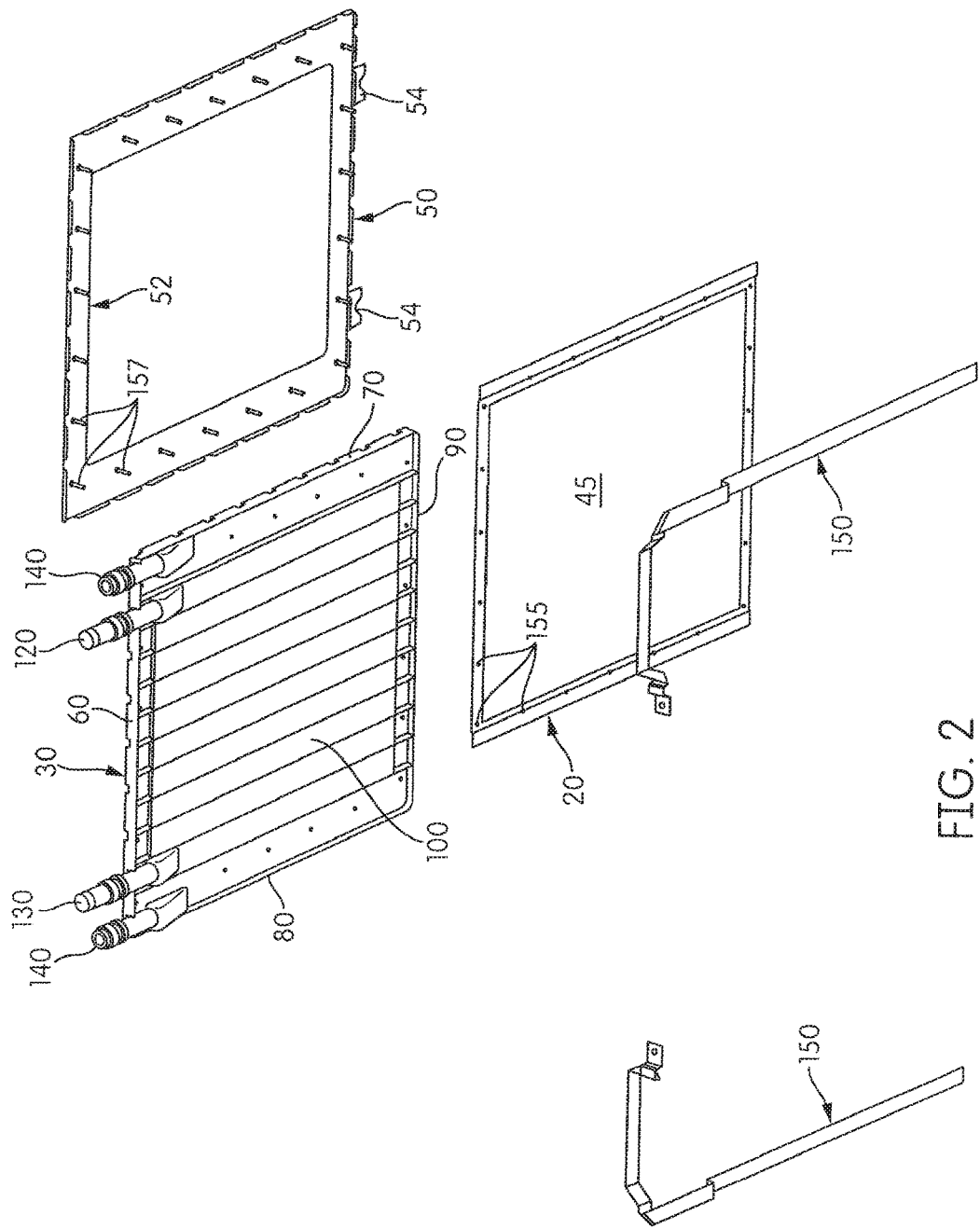
FIG. 2 illustrates an exploded view of the immersible oxidant reduction electrode module of FIG. 1.

FIG. 2 illustrates an exploded view of the oxidant reduction electrode module 10, taken from a perspective to the back portion 100 of the housing 30. As shown in this view, edges of the oxidant reduction electrode 20 may contain alignment holes 155 to align and mount the oxidant reduction electrode 20 onto the mounting frame 50. In the illustrated embodiment, mounting frame 50 contains alignment posts 157, which are received in the alignment holes 155 to spatially orient the oxidant reduction electrode 20. In an embodiment, a sealant may be applied between the alignment posts 157 and the aperture 52, and/or on a corresponding portion of the oxidant reduction electrode 20, so that ionically conductive medium cannot seep around the edges of the aperture 52. The sealant may be of any suitable construction or composition, including but not limited to those examples listed above.

Assembly of the oxidant reduction electrode module 10 may be by any suitable process. For example, the electrical conductors 150 may be inserted into the conductor channels 140 either before or after the oxidant reduction electrode 20 is mounted onto the mounting frame 50, so that the electrical connections for the oxidant reduction electrode 20 may be established prior to sealing the housing 30. Although in the illustrated embodiment the conductors are located within the gaseous oxidant space, in other embodiments the conductors may extend in shielded cables through the ionically conductive medium. In still other embodiments, instead of extending through conductor channels 140, the electrical conductors 150 may pass through the ports 110. Again, sealant may be applied between the oxidant reduction electrode 20 and the mounting frame 50. The electrical conductors 150 may be of any suitable construction or configuration, including but not limited to being plates, ribbons, wire, cables, or any other body configured to conduct electrons to and/or from the oxidant reduction electrode 20.

Figure 3:
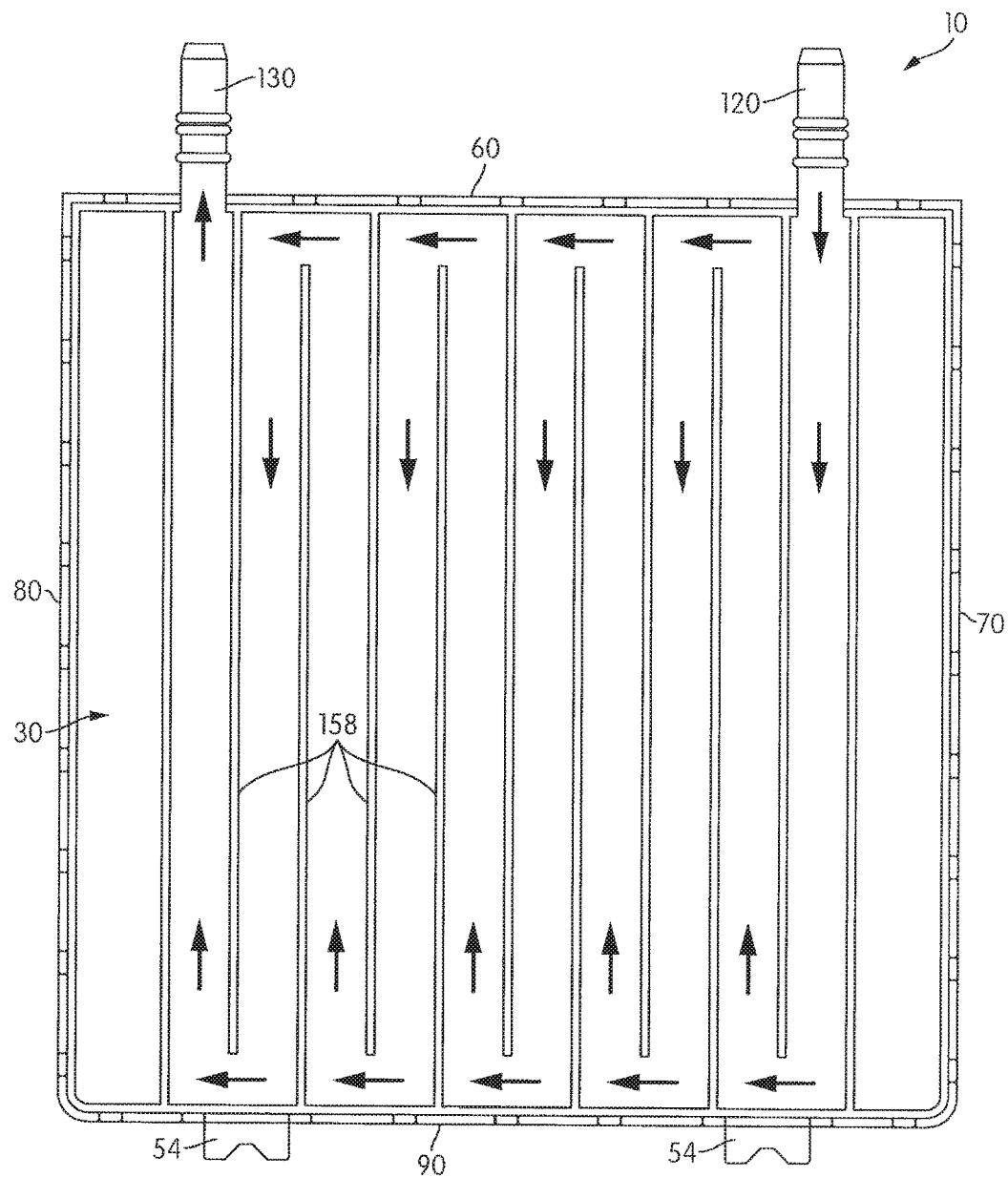
FIG. 3 illustrates a cross sectional view of the immersible oxidant reduction electrode module of FIG. 1, showing a gaseous oxidant flow path formed therein.

As shown in FIG. 3, in some embodiments of the oxidant reduction electrode module 10, a gaseous oxidant path may be present within the gaseous oxidant space, so as to guide gaseous oxidant flowing from the gaseous oxidant inlet 120 to the gaseous oxidant outlet 130. The gaseous oxidant path may be formed by any suitable body or mechanism, including but not limited to comprising baffles 158 or other path walls that are formed on or mounted to the housing 30. As shown, in some embodiments the gaseous oxidant path may form a repetitive, tortuous path that flows downwards and upwards across the housing 30 from the gaseous oxidant inlet 120 to the gaseous oxidant outlet 130, such that gaseous oxidant is guided along a substantial portion of the oxidant reduction electrode 20 mounted to the housing 30. Such a gaseous oxidant path might not be found in some embodiments of the oxidant reduction electrode module 10, however, and instead the gaseous oxidant inlet 120 and gaseous oxidant outlet 130 may simply communicate to a generally open space defined within the gaseous oxidant space. As described in greater detail below, it may be appreciated that the baffles 158 (which may refer to any body extending into the gaseous oxidant space and modify movement of gaseous oxidant therein) may generally facilitate an easing or other distribution of the forces of the liquid ionically conductive medium on the oxidant reduction electrode 20, by providing a generally rigid support structure between the oxidant facing side 45 of the oxidant reduction electrode 20 and the back portion 100 of the housing 30 (i.e. through the gaseous oxidant space).

Although in some embodiments the oxidant reduction electrode module 10 may be immersed into the liquid ionically conductive medium so as to form an electrochemical cell with a fuel electrode already present therein, in other embodiments the oxidant reduction electrode module 10 may be mounted to a fuel electrode, such that both electrodes may be immersed into ionically conductive medium together to form the cell. FIGS. 4A and 4B depict opposing views of the oxidant reduction electrode module 10 as aligned for coupling with a fuel electrode module 160. As shown, the fuel electrode module 160 contains a fuel electrode 170 supported between a pair of fuel electrode supports 173. As depicted in FIGS. 4A and 4B, the fuel electrode module 160 is positioned so that the ionically conductive medium facing side 40 of the oxidant reduction electrode 20 would slide upwards behind the fuel electrode 170, such that the ionically conductive medium facing side 40 faces the fuel electrode 170. FIG. 4A shows the ionically conductive medium facing side 40 of the oxidant reduction electrode 20, and FIG. 4B shows the side of the fuel electrode which side 40 faces. As seen in FIG. 4A, but obscured in FIG. 4B, in some embodiments the fuel electrode supports 173 may contain engagement ridges 175 that are configured to engage the engagement tabs 56, so as to position the oxidant reduction electrode 20 relative to the fuel electrode 170. Other mechanisms of maintaining a desired distance between the oxidant reduction electrode 20 and the fuel electrode 120 are also possible, and may vary across embodiments.

FIGS. 4A and 4B further show that the fuel electrode module 160 may be coupled to or otherwise include a cell cover 180, which may be configured to receive the oxidant reduction electrode module 10 when the oxidant reduction electrode module 10 is positioned alongside the fuel electrode 170 in the fuel electrode module 160. In embodiments where the fuel electrode module 160 and the oxidant reduction electrode module 10 are jointly coupled to the cell cover 180, the cell cover 180 may be configured to receive the fuel electrode module 160 and the oxidant reduction electrode module 10 after they are jointly mounted together, or may be configured to receive either one first, followed by the other. As shown in the illustrated embodiment, the fuel electrode module 160 and the cell cover 180 may be jointly mounted together, and configured to jointly receive the oxidant reduction electrode module 10 therein. In some embodiments, such as that shown, the gaseous oxidant inlet 120 and gaseous oxidant outlet 130 of the oxidant reduction electrode module 10 may be configured to be respectively received by corresponding receptacles 190 and 200 in the cell cover 180. Likewise, the cell cover 180 may have receptacles 210 to receive conductors 220 electrically connected to the fuel electrode 170, and may have receptacles 230 configured to receive the conductor channels 140 of the oxidant reduction electrode module 10 (and the electrical conductors 150, not shown in the views of FIGS. 4A and 4B, that would electrically connect the oxidant reduction electrode 20). Additionally shown in the views of FIGS. 4A and 4B are circuitry mounts 240 at the top of the cell cover 180, positioned such that circuitry such as circuit boards, switches, or so on may electrically connect to the conductors 220 from the fuel electrode 170 and the electrical conductors 150 from the oxidant reduction electrode 20, as described in greater detail below.

Figure 5:
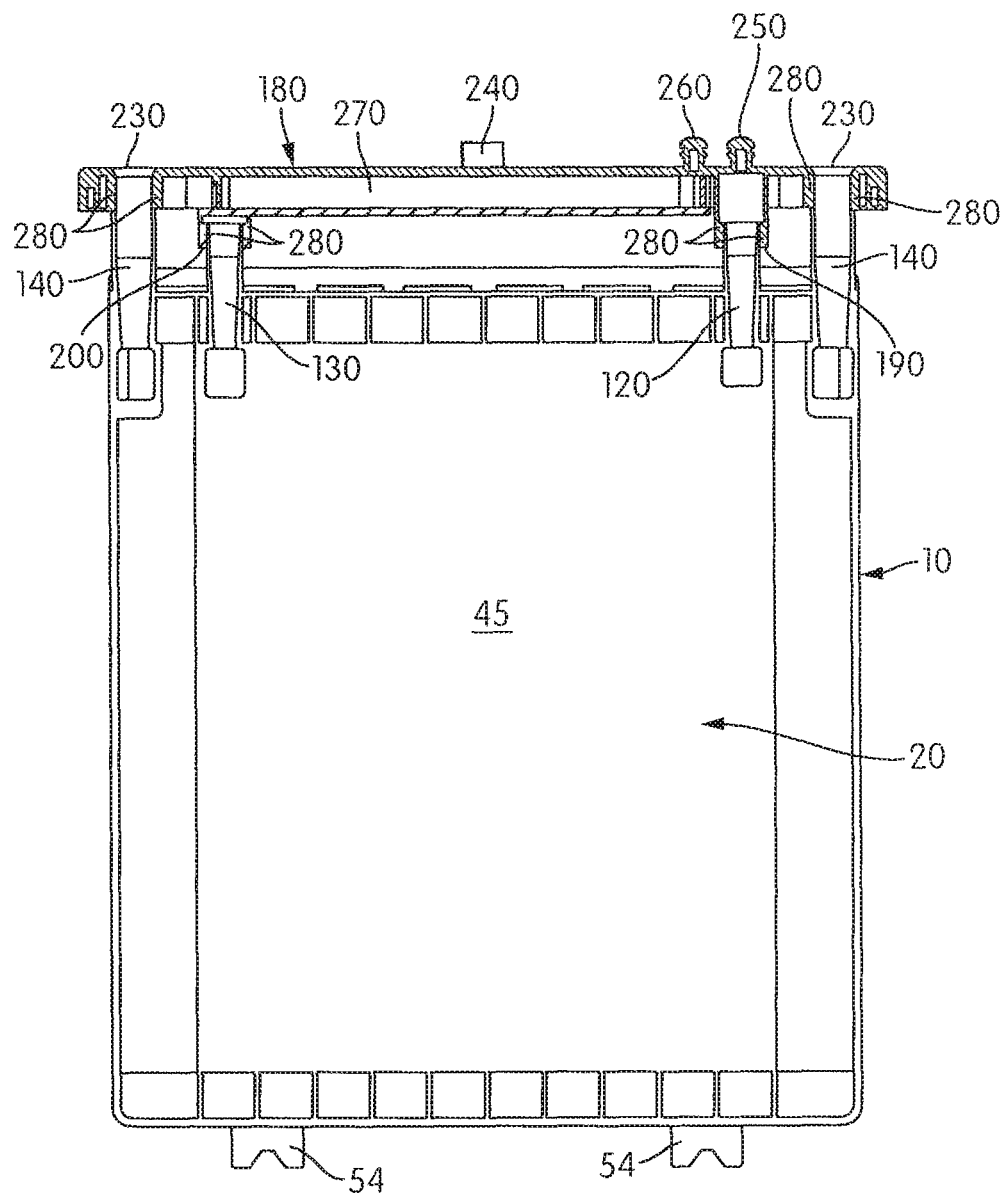
FIG. 5 illustrates a cross sectional view of the engagement of the oxidant reduction electrode module and the cell cover, configured to allow a flow of gaseous oxidant to pass therethrough.

In some embodiments, ports on the cell cover 180 may couple to the ports 110 on the oxidant reduction electrode module 10, so as to allow the flow of gaseous oxidant therethrough. For example, as that shown in FIGS. 4A and 4B, a cell cover gaseous oxidant inlet 250 and a cell cover gaseous oxidant outlet 260 may be provided in the cell cover 180, and configured to direct the flow of gaseous oxidant into the gaseous oxidant inlet 120, and out of the gaseous oxidant outlet 130, of the oxidant reduction electrode module 10. Shown in FIG. 5 is a cross sectional view of the oxidant reduction electrode module 10 facing the oxidant facing side 45 of the oxidant reduction electrode 20, as the oxidant reduction electrode module 10 is inserted into the cell cover 180, such that the gaseous oxidant inlet 120 is received into the receptacle 190, and the gaseous oxidant outlet 130 is received in to the receptacle 200. In an embodiment, the cell cover gaseous oxidant inlet 250 may lead directly into the receptacle 190, so that the flow of gaseous oxidant therefrom is directed into the gaseous oxidant inlet 120 of the oxidant reduction electrode module 10 received therein. In an embodiment, a cell cover oxidant channel 270 is formed in the cell cover 180 between the receptacle 200 and the cell cover gaseous oxidant outlet 260, allowing gaseous oxidant received from the gaseous oxidant outlet 130 of the oxidant reduction electrode module 10 to be directed within the cell cover 180. As shown, the cell cover oxidant channel 270 may be arranged so that even while the gaseous oxidant outlet 130 is spaced from the gaseous oxidant inlet 120 in the oxidant reduction electrode module 10, the cell cover gaseous oxidant outlet 260 may be adjacent to the cell cover gaseous oxidant inlet 250. Such adjacent positioning of the cell cover gaseous oxidant inlet 250 and cell cover gaseous oxidant outlet 260 may facilitate and simplify linkages thereto, as described below.

Further shown in FIG. 5 is that in some embodiments gaskets 280 may be provided at the linkages between the oxidant reduction electrode module 10 and the cell cover 180. In the illustrated embodiment, the gaskets 280 are positioned between the gaseous oxidant inlet 120 and the receptacle 190, and between the gaseous oxidant outlet 130 and the receptacle 200. Such gaskets 280 may prevent seepage of the gaseous oxidant flow out of the gaseous oxidant flow path defined between the cell cover 180 and the gaseous oxidant space in the oxidant reduction electrode module 10, as well as preventing ionically conductive medium to leak into the oxidant reduction electrode module 10, into the cell cover 180, or between the cell cover 180 and a chamber containing the ionically conductive medium that the cell cover 180 engages, as discussed below, when the oxidant reduction electrode module 10 is immersed therein. Additional gaskets 280 may be provided between the conductor channels 140 and the cell cover 180 where they meet at the receptacles 230, and in some embodiments may also be configured to prevent inadvertent seepage of ionically conductive medium between the cell cover 180 and the oxidant reduction electrode module 10 when the oxidant reduction electrode module 10 is immersed into the ionically conductive medium, as described below.

FIGS. 6A and 6B depict opposing perspective views of a cell assembly 290 that is formed when the oxidant reduction electrode module 10 engages the cell cover 180 of the fuel electrode module 160, so that gaseous oxidant entering the cell cover gaseous oxidant inlet 250 may flow through the gaseous oxidant space of the oxidant reduction electrode module 10, and back out the cell cover gaseous oxidant outlet 260. While FIG. 6A shows the side of the cell assembly 290 containing the fuel electrode 170, FIG. 6B shows the side of the cell assembly 290 containing the oxidant reduction electrode module 10. As is shown in the enlargement of FIG. 6A, the engagement tabs 56 may extend from the mounting support 50, so as to form a recess that may receive the engagement ridge 175 on the fuel electrode supports 173 as the oxidant reduction electrode module 10 is slidably positioned alongside the fuel electrode module 160. Although in some embodiments the engagement tabs 56 may be formed integrally with the mounting support 50, in other embodiments the engagement tabs 56 may be at least partially assembled onto the mounting support 50. For example, in some embodiments rubber or another resilient material may be positioned within the recess, so as to provide a desired fitness between the recess and the engagement ridge 175. Also as shown, in some embodiments the ridge formed on terminal ones of the engagement tabs 56 might not extend fully across the engagement clip 56, so that an end of the engagement ridge 175 may be prevented from sliding fully therethrough, further assisting in positioning oxidant reduction electrode module 10 relative to the fuel electrode module 160.

In an embodiment, once the cell assembly 290 is immersed in ionically conductive medium, and gaseous oxidant (including but not limited to air, a gas with a high concentration of oxygen, or pure oxygen) is supplied to the oxidant reduction electrode 20 via the cell cover gaseous oxidant inlet 250, an electrochemical cell may be formed. In some embodiments, the electrochemical cell may be discharged by electrically connecting the fuel electrode 170 and the oxidant reduction electrode 20 to a load (if the fuel electrode 170 has fuel therein), or may be recharged by electrically connecting the fuel electrode 170 and the oxidant reduction electrode 20 to a power supply (if the ionically conductive medium contains a reducible fuel species), as discussed in greater detail below.

Figure 7:
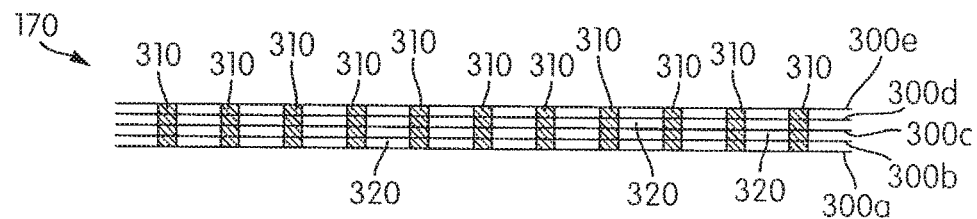
FIG. 7 illustrates a cross sectional view of the fuel electrode of the cell assembly, showing a plurality of electrode bodies separated by spacers therebetween to form flow lanes therein.

Turning to FIG. 7, the configuration of an embodiment of the fuel electrode 170 may be appreciated by the illustrated cross sectional view of the fuel electrode module 160 across the fuel electrode 170. As shown, in some embodiments the fuel electrode 170 may comprise a plurality of permeable electrode bodies 300a-300e (generically permeable electrode bodies 300). The plurality of permeable electrode bodies 300 may be separated from one another by a plurality of spacers 310 that create flow lanes 320 in the fuel electrode 170, along which the ionically conductive medium may flow, as described in greater detail below. In an embodiment, the fuel electrode 170 is a metal fuel electrode that functions as an anode when the cell assembly 290 is immersed in ionically conductive medium and operates in discharge, or electricity generating, mode, as discussed in further detail below. Each of the permeable electrode bodies 300 may include a screen that is made of any formation that is able to capture and retain, through electrodepositing, or otherwise, particles or ions of metal fuel from the ionically conductive medium that flows along the cell assembly 290.

In some embodiments, the plurality of spacers 310 may extend across the fuel electrode 170 in a spaced relation to each other. While in some embodiments the plurality of spacers 310 may terminate short of the cell cover 180, such as was depicted in FIG. 6A, in other embodiments the spacers 310 may extend to the cell cover 180, so as to assist in holding the fuel electrode 170 relative to the surrounding components of the fuel electrode module 160. As illustrated in FIG. 7, sets of the plurality of spacers 310 may separate the permeable electrode bodies 300a-300e, so that each set of spacers 310 is positioned in between adjacent electrode bodies 300 to electrically isolate the electrode bodies 300a-300e from each other. Within each set of spacers 310 between adjacent electrode bodies 300, the spacers 310 may be positioned in a spaced relation in a manner that creates the so-called flow lanes 320 therebetween. The spacers 310 are non-conductive and electrochemically inert so they are inactive with regard to the electrochemical reactions in the electrochemical cell formed when the cell assembly 290 is immersed in the ionically conductive medium. In some embodiments, the spacers 310 may be made from a suitable plastic material, such as polypropylene, polyethylene, polyester, noryl, fluoropolymer, or so on. The flow lanes 320 are three-dimensional and may have a height that is substantially equal to the height of the spacers 310, as illustrated in FIG. 7.

In an embodiment, the permeable electrode bodies 300a-300e and the spacers 310 may be formed as a single unit prior to installation into the remainder of the fuel electrode module 160. In some embodiments, the fuel electrode supports 173 may also be formed integrally with the permeable electrode bodies 300a-300e and the spacers 310. In other words, the fuel electrode 170 and components of the remainder of the fuel electrode module 160 may be formed as a single unit using any suitable manufacturing process. For example, in an embodiment, manufacturing spacers (not shown) that are substantially the size of the desired flow lanes 320 may be placed between adjacent permeable bodies 300a-300e to hold the adjacent permeable electrode bodies 300a-300e in a substantially parallel spaced relation. The manufacturing spacers that are located between the same adjacent permeable electrode bodies are preferably substantially parallel to each other and equally spaced along the electrode bodies 300a-300e, and the manufacturing spacers that are located on opposite sides of the same electrode body are preferably substantially aligned with each other. After the electrode bodies 300a-300e and manufacturing spacers are in place and held together by any suitable means, a suitable material to be used for the spacers 310 may be injected in between the manufacturing spacers and through the permeable electrode bodies 300a-300e. After the material hardens or cures, the manufacturing spacers may be removed from the fuel electrode 170 to create the single electrode scaffold unit 170 illustrated in FIG. 6.

In an embodiment, an injection mold may be fabricated such that the manufacturing spacers are part of the mold, such as is described in U.S. patent application Ser. No. 12/901,410, filed on Oct. 8, 2010, and incorporated herein in its entirety by reference. Slots may be formed in the mold to accommodate the permeable electrode bodies 300a-300e, and cavities defining the volumes for the spacers 310 may also be formed. Each of the electrode bodies 300a-300e may be inserted into the mold in a parallel spaced relation to an adjacent body, and the material to be used for the spacers 310 may then be injected into the cavities to form the spacers 310. After the material has cooled in the mold, the first electrode 170 may be ejected from the mold as a single unit containing the permeable electrode bodies 300a-300e and the spacers 310. Of course, any suitable manufacturing method that allows the spacers 310 to be integrally formed on and through the permeable electrode bodies 300a-300e so that the fuel electrode 170 comprising the electrode bodies 300a-300e and the spacers are a single unit may be used. The above-described methods are not intended to be limiting in any way.

Figure 8:
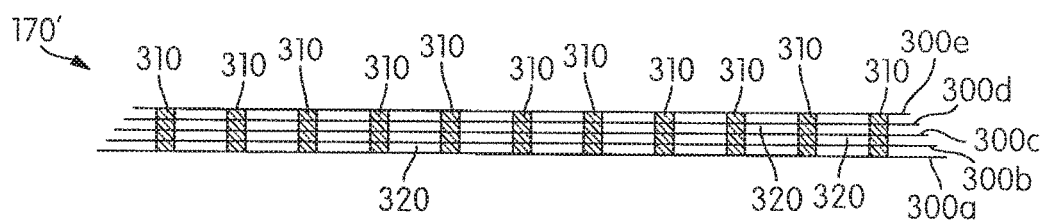
FIG. 8 illustrates a cross sectional view of another embodiment of the fuel electrode, having a stepped scaffold configuration that is stepped across the orientation of the flow lanes.

In some embodiments, the permeable electrode bodies 300a-300e may be of substantially the same size. In an embodiment, the permeable electrode bodies 300a-300e may have different sizes so that a stepped scaffold configuration may be used, as described by U.S. patent application Ser. No. 13/167,930, and incorporated herein in its entirety by reference. For example, as may be seen in the view of the fuel electrode 170 in FIG. 4B, extremities of the fuel electrode 170 proximal and distal to the cell cover 180 may be staggered, such that the electrode bodies 300 are incrementally smaller the closer they would be to the oxidant reduction electrode 20. Although, in the embodiment of FIG. 4B the fuel electrode 170 is received on either side within the fuel electrode supports 173, in some embodiments other mechanisms for supporting the fuel electrode 170 are possible, and in such cases, the fuel electrode 170 may additionally or alternatively be staggered in size perpendicular to the orientation of the flow lanes 320, as is shown in the embodiment of fuel electrode 170' depicted in FIG. 8. As one non-limiting example, one or more of the spacers 310 may couple the fuel electrode 170' to the cell cover 180.

Figure 9:
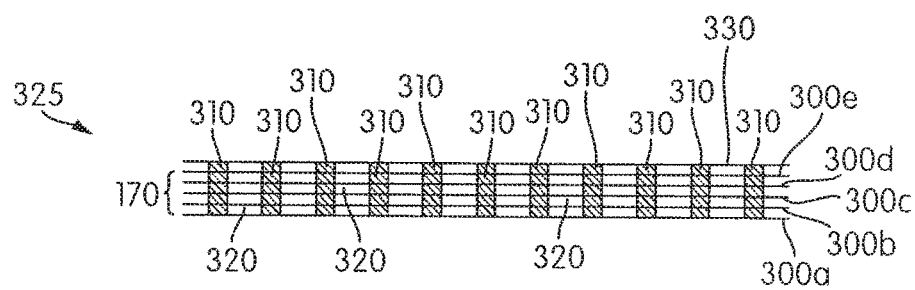
FIG. 9 illustrates a cross sectional view of an electrode assembly formed from the fuel electrode of the cell assembly and a separate charging electrode.

Shown in FIG. 9 is an embodiment of an electrode assembly 325 that contains the fuel electrode 170 coupled to a separate charging electrode 330 that is spaced adjacent to a permeable electrode body 300e. In some embodiments of the electrode assembly 325, the separate charging electrode 330 may simply be the electrode body that is proximal to the oxidant reduction electrode 20. In other embodiments, there might not be a "separate" charging electrode such as separate charging electrode 330, and the oxidant reduction electrode 20 may be utilized both during charging and discharging of the electrochemical cell (i.e. as an anode during charging and as a cathode during discharging). In some embodiments, the separate charging electrode 330 may extends at least as far as the longest of the permeable electrode bodies 300, when those electrode bodies 300 are in a stepped scaffold configuration, or otherwise vary in size. In other embodiments the separate charging electrode 330 may be stepped smaller than the smallest of the electrode bodies 300. As with the electrode bodies 300, a stepped reduction in size of the separate charging electrode 330, if present, may be in the orientation of the flow lanes 320, across the orientation of the flow lanes 320, or both.

While in some embodiments, such as those illustrated above, the permeable electrode bodies 300 may be associated with a single oxidant reduction electrode 20, in other embodiments the permeable electrode bodies 300 may be associated with a plurality of oxidant reduction electrodes 20. It may therefore be appreciated that each fuel electrode 170 (e.g., where there are a plurality of fuel electrodes 170 in the electrochemical cell system) may be associated with one or more associated oxidant reduction electrodes 20. Where there are a plurality of oxidant reduction electrodes 20 in the electrochemical cell system, it may be understood that one or more electrochemical cells may be defined by each fuel electrode 170 and at least one oxidant reduction electrode 20 associated with that fuel electrode 170. As an example, the permeable electrode bodies 300 may be positioned between two opposing oxidant reduction electrodes 20 (and corresponding oxidant reduction electrode modules 10), and may form one or more electrochemical cells, depending on the application of anodic and cathodic potentials, as described in greater detail below. While in some embodiments the permeable electrode bodies 300 associated with each of the oxidant reduction electrodes 20 may be generally the same size, it may be appreciated that the stepped scaffold configuration of the plurality of permeable electrode bodies 300 may be implemented. Accordingly, in some embodiments, the permeable electrode bodies 300 may be stepped smaller in size in opposing directions facing each of the opposing oxidant reduction electrodes 20.

Figure 10:
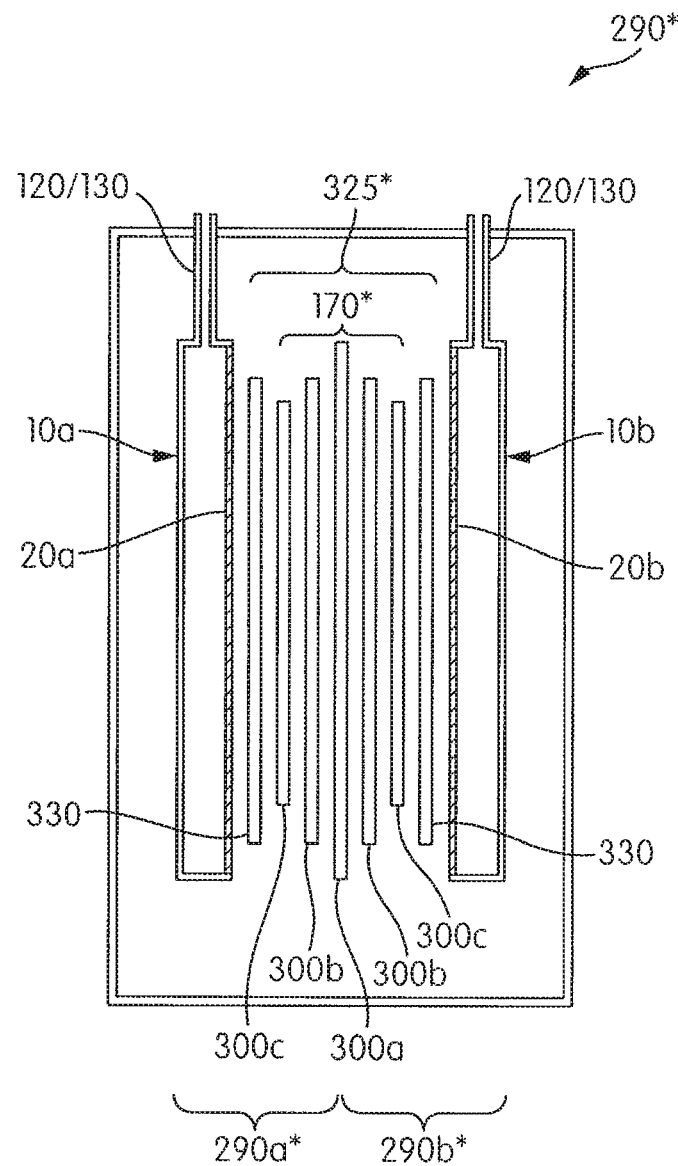
FIG. 10 illustrates a schematic view of a cell assembly having a fuel electrode with a stepped scaffold configuration stepped in opposing directions, and configured to be positioned between opposing immersible oxidant reduction electrode modules.

As shown in FIG. 10, in an embodiment the permeable electrode bodies 300 may be assembled in a fuel electrode 170*, with the permeable electrode body 300a common to both oxidant reduction electrodes 20 (specifically, oxidant reduction electrode 20a and oxidant reduction electrode 20b, associated with oxidant reduction electrode module 10a and oxidant reduction electrode module 10b respectively). While in some embodiments there may be a pair of permeable electrode bodies 300a, each being generally the same size, larger than others of the plurality of permeable electrode bodies 300, in other embodiments, such as that illustrated in FIG. 10, a single permeable electrode body 300a may be centered relative to the oxidant reduction electrodes 20a and 20b.

In some embodiments, such as that illustrated, the fuel electrode 170* may include opposing pairs of the permeable electrode bodies 300b, and 300c, each being stepped smaller than the previous permeable electrode body 300, from the permeable electrode body 300a towards the oxidant reduction electrodes 20a and 20b. In such a configuration, with a common fuel electrode 170* between a pair of opposing oxidant reduction electrodes 20, a cell assembly 290* may be formed, containing two cells (e.g., cell 290a* and cell 290b*) therein. It may be appreciated that such a cell assembly 290* may therefore be considered a bicell. In an embodiment, the cell 290a* may include the oxidant reduction electrode 20a and those permeable electrode bodies 300 of the fuel electrode 170* associated with the oxidant reduction electrode 20a, while the cell 290b* may include the oxidant reduction electrode 20b and those permeable electrode bodies 300 of the fuel electrode 170* associated with the oxidant reduction electrode 20b. As noted above, in some embodiments, each oxidant reduction electrode 20 may be associated with the common fuel electrode 170* to form a single cell 290. The number of permeable electrode bodies 300 associated with each of the oxidant reduction electrodes 20 may vary across embodiments, and in some embodiments may vary during operation of the cell assembly 290*, such as through management of electrical connections associated with each of the permeable electrode bodies 300.

In the illustrated embodiment, with a single permeable electrode body 300a centered between the oxidant reduction electrodes 20a and 20b, the permeable electrode body 300a may be associated with either cell 290a* or cell 290b*. In some embodiments, however, the entirety of the common fuel electrode 170* may be understood as participating in electrochemical reactions with both oxidant reduction electrode 20a and oxidant reduction electrode 20b.

In the illustrated embodiment, the common fuel electrode 170* may be assembled in a common electrode assembly 325*, which may include a pair of separate charging electrodes 330 (each associated with one of the oxidant reduction electrode 20a and the oxidant reduction electrode 20b). As such, the cell assembly 290a* may include one of the separate charging electrodes 330, while the cell assembly 290b* includes the other of the separate charging electrodes 330. It may be appreciated that the common fuel electrode 170* and/or the common electrode assembly 325* may be formed by any appropriate construction, including but not limited to being integrally formed with nonconductive spacers between each of the permeable electrode bodies 300 (and between the common fuel electrode 170* and the separate charging electrodes 330). In some embodiments the spacers may form flow lanes between each of the permeable electrode bodies 300 and between the common fuel electrode 170* and the separate charging electrodes 330. The flow lanes may be oriented in any appropriate direction to achieve a desired flow direction. It may be appreciated that the cell assembly 290* is illustrated schematically in FIG. 10. As such, the illustrated spacing is exaggerated. Similarly, spacings in other illustrated embodiments are also exemplary, and are not to be considered limiting in any way.

Figure 11:
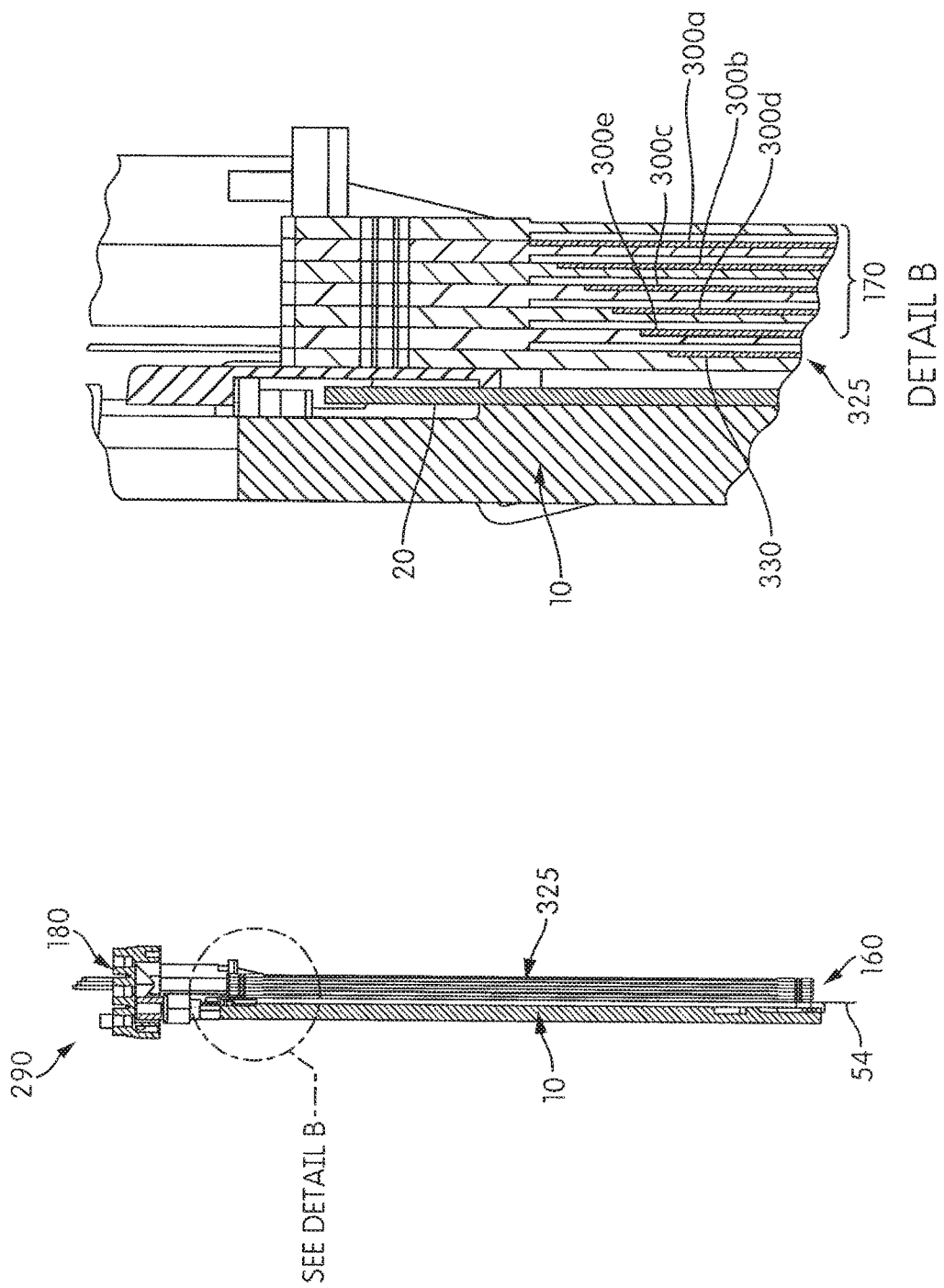
FIG. 11 illustrates a cross sectional view of the cell assembly, showing a stepped scaffold configuration along the orientation of the flow lanes for the fuel electrode, including a stepped reduction in size of the separate charging electrode.

FIG. 11 depicts a side cross sectional view of the cell assembly 290, as viewed along line X of FIG. 6A. As shown in the enlargement, the fuel electrode module 160 contains the electrode assembly 325 with the fuel electrode 170 containing five permeable electrode bodies 300a-300e, wherein the permeable electrode bodies 300 are in the stepped scaffold configuration such that electrode body 300a is larger than electrode body 300b, which is larger than the electrode body 300c, and so on, in the direction towards the oxidant reduction electrode 20. As shown, between the electrode body 300e and the oxidant reduction electrode 20 is the separate charging electrode 330. In the illustrated embodiment of FIG. 11, the separate charging electrode 330 is stepped smaller than the smallest of the permeable electrode bodies 300e. In other embodiments, however, the separate charging electrode 330 may be any appropriate size, including but not limited to being the size of the largest of the electrode bodies 300.

Figure 12:
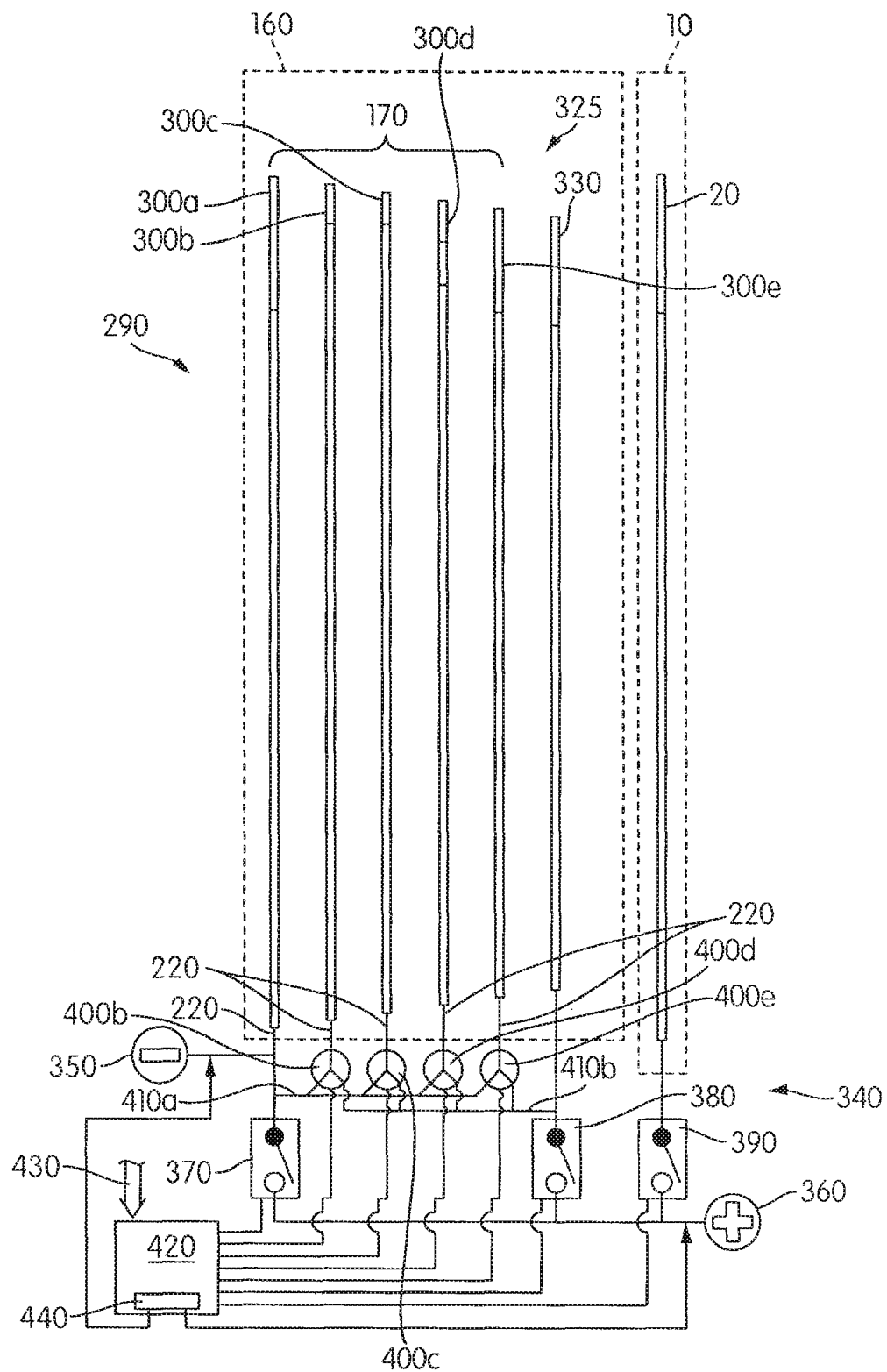
FIG. 12 depicts a schematic view of the electrical connections of the cell assembly wherein the fuel electrode, the separate charging electrode and the oxidant reduction electrode are electrically connected via a switching system.

As noted above, in some embodiments the cell cover 180 may contain circuitry mounts 240 that are configured to receive breadboards or other electronic components that may allow for control of the electrical connections between the fuel electrode 170 and the oxidant reduction electrode 20. In an embodiment, electrical connections between each of the permeable electrode bodies 300 may be controlled, so as to allow for greater control of the charging or the discharging of the electrochemical cell. Shown in FIG. 12 is a schematic view of an embodiment of the cell assembly 290, having both the fuel electrode module 160 and the oxidant reduction electrode module 10 adjacent to one another. The electrical conductors 220 in the illustrated embodiment extend from both the fuel electrode 170 and the separate charging electrode 330 of the electrode assembly 325. Again, while the illustrated embodiment of the fuel electrode 170 has only five electrode bodies 300 (specifically electrode bodies 300a-300e), any number may be used. The embodiment of the electrochemical cell described herein is by way of example only, and is not intended to be limiting in any way.

In some embodiments, the electrode bodies 300a-e may be screens that are made of any formation able to capture and retain, through electrodepositing, or otherwise, particles or ions of metal fuel from the ionically conductive medium that the cell assembly 290 is immersed into. Components of the cell, including for example, the fuel electrode 170, the permeable electrode bodies 300a-e thereof, the separate charging electrode 330, and the oxidant reduction electrode 20, may be of any suitable construction or configuration, including but not limited to being constructed of Nickel or Nickel alloys (including Nickel-Cobalt, Nickel-Iron, Nickel-Copper (i.e. Monel), or superalloys), Copper or Copper alloys, brass, bronze, or any other suitable metal. In an embodiment, a catalyst film may be applied to some or all of the permeable electrode bodies 300a-e, the separate charging electrode 330 and/or the oxidant reduction electrode 20, and have a high surface material that may be made of some of the materials described above. In an embodiment, the catalyst film may be formed by techniques such as thermal spray, plasma spray, electrodeposition, or any other particle coating method.

The fuel may be a metal, such as iron, zinc, aluminum, magnesium, or lithium. By metal, this term is meant to encompass all elements regarded as metals on the periodic table, including but not limited to alkali metals, alkaline earth metals, lanthanides, actinides, and transition metals, either in atomic, molecular (including metal hydrides), or alloy form when collected on the electrode body. However, the present invention is not intended to be limited to any specific fuel, and others may be used. The fuel may be provided to the fuel electrode 170 as particles suspended in the ionically conductive medium. In some embodiments, a metal hydride fuel may be utilized in the electrochemical cell.

The ionically conductive medium may be an aqueous solution. Examples of suitable mediums include aqueous solutions comprising sulfuric acid, phosphoric acid, triflic acid, nitric acid, potassium hydroxide, sodium hydroxide, sodium chloride, potassium nitrate, or lithium chloride. The medium may also use a non-aqueous solvent or an ionic liquid. In an embodiment, the ionically conductive medium may comprise an electrolyte. For example, a conventional liquid or semi-solid electrolyte solution may be used, or a room temperature ionic liquid may be used, as mentioned in U.S. patent application Ser. No. 12/776,962, the entirety of which is incorporated herein. In an embodiment where the electrolyte is semi-solid, porous solid state electrolyte films (i.e. in a loose structure) may be utilized. In embodiments where the ionically conductive medium is not a liquid, immersing the cell assembly 290 within the ionically conductive medium may comprise embedding the cell assembly 290 within the non-flowing ionically conductive medium, with the gaseous oxidant channels leading into and out of the oxidant reduction electrode module 10 protruding therefrom.

The fuel may be oxidized at the fuel electrode 170 when the fuel electrode 170 is operating as an anode, and an oxidizer, such as oxygen from the gaseous oxidant in the gaseous oxidant space of the oxidant reduction electrode module 10, may be reduced at the oxidant reduction electrode 20 when the oxidant reduction electrode 20 is operating as a cathode, which is when the electrochemical cell is connected to a load L for a discharge or electricity generation mode, as discussed in further detail below. The reactions that occur during discharge mode may generate by-product precipitates, e.g., a reducible fuel species, in the ionically conductive medium. For example, in embodiments where the fuel is zinc, zinc oxide may be generated as a by-product precipitate/reducible fuel species. The oxidized zinc or other metal may also be supported by, oxidized with or solvated in the electrolyte solution, without forming a precipitate (e.g. zincate may be a dissolved reducible fuel species remaining in the fuel). During a recharge mode, which is discussed in further detail below, the reducible fuel species, e.g., zinc oxide, may be reversibly reduced and deposited as the fuel, e.g., zinc, onto at least a portion of the fuel electrode 170 that functions as a cathode during recharge mode. During recharge mode, either the oxidant reduction electrode 20 or the separate charging electrode 330, and/or another portion of the fuel electrode 170, as described below, functions as the anode.

Thus, it may be appreciated that in some embodiments the electrochemical reactions that occur in the cell when the cell assembly 290 is immersed in the ionically conductive medium may be reduction-oxidation (redox) reactions. As one non-limiting example, where the ionically conductive medium contains reducible zinc oxide that is to be plated as zinc fuel on the fuel electrode 170, the reduction reaction takes place at the fuel electrode 170 (the reduction site), and may conform to $ZnO+H_2O+2e^-\rightarrow Zn+2OH^-$. The corresponding oxidation reaction occurs at the charging electrode (i.e. the separate charging electrode 330), and may conform to $2OH^-\rightarrow 2e^-+\frac{1}{2}O_2+H_2O$. The charging electrode (which may be characterized as an oxygen evolving electrode) is therefore understood to be producing oxygen gas within the cell. In other embodiments, such as where different metal fuels are utilized, other reactions may occur, which may also evolve oxygen in the cell.

As shown in FIG. 12, a switching system 340 may be provided to control or manage the electrical connections for each of the electrode bodies 300, the separate charging electrode 330, and the oxidant reduction electrode 20 In an embodiment, the switching system 340 may be configured to connect the cell assembly 290 to a power supply PS, a load L, or other cell assemblies 290 (i.e. in series or in parallel) when immersed in an ionically conductive medium. Such connections may be made through the first terminal 350 and a second terminal 360, wherein the first terminal 350 is negative (cathodic) and the second terminal 360 is positive (anodic) during recharging. During discharge, the fuel electrode 170 is connected to the load L, and operates as an anode so that electrons given off by the metal fuel, as the fuel is oxidized at the fuel electrode 170, flows to the external load L. The oxidant reduction electrode 20 functions as the cathode during discharge, and is configured to receive electrons from the external load L and reduce an oxidizer that contacts the oxidant reduction electrode 20, specifically oxygen in the gaseous oxidant in the gaseous oxidant space of the immersed oxidant reduction electrode module 10. Thus, in an embodiment, the oxidant reduction electrode 20 may be a metal-gaseous oxidant breathing cathode.

The operation of the switching system 340 may vary across embodiments, and in some embodiments the operation of the switching system 340 may be similar to those described in U.S. patent application Ser. No. 13/299,167, incorporated herein in its entirety by reference. As another example, in an embodiment, the external load L may be coupled to each of the permeable electrode bodies 300a-300e in parallel, as described in detail in U.S. patent application Ser. No. 12/385,489, filed on Apr. 9, 2009 and incorporated herein by reference in its entirety. In other embodiments, the external load L may only be coupled to a terminal one of the permeable electrode bodies 300a-300e (i.e. the electrode body 300a, distal from the oxidant reduction electrode 20), so that fuel consumption may occur in series from between each of the permeable electrode bodies 300a-300e.

In the illustrated embodiment of FIG. 12, the switching system 340 includes a bypass switch 370, a charging electrode switch 380, and an oxidant reduction electrode switch 390. The bypass switch 370 is configured to electrically connect the first terminal 350 to the second terminal 360, bypassing the cell assembly 290 for any number of reasons, including but not limited to staggering usage of a plurality of cells formed by the immersion of a plurality of cell assemblies 290, isolating defective cell assemblies 290, or so on. The oxidant reduction electrode switch 390 allows connection of the oxidant reduction electrode 20 to the second terminal 360 to create a potential difference between the fuel electrode 170 and the oxidant reduction electrode 20 during discharge of the electrochemical cell. The charging electrode switch 380 is configured to connect at least the charging electrode 330, and potentially some of the fuel electrode 170 (as described in greater detail below) to the second terminal 360, so as to create a potential difference with the remainder of the fuel electrode 170, connected to first terminal 350.

In some non-limiting embodiments, the switches of switching system 340 may be single pole single throw or single pole double throw. They may be of the pivoting, sliding or latching relay type. Also, semiconductor based switches may be used as well. The switches may be activated electrically (electromechanical relay) or magnetically or by other methods known to those familiar in the art. Any other suitable type of switch may be used, and the examples herein are not limiting. In an embodiment, the plurality of switches may be connected in series if the switch has a leakage current in one direction. For example, the body diode of a MOSFET semiconductor based switch will conduct in one direction and the leakage current can be eliminated by placing MOSFET semiconductor based switches facing back to back in series.

As is shown in the illustrated embodiment, a plurality of electrode body switches 400b-e are configured to alternatively connect each of electrode bodies 300b-e to either a first bus 410a associated with electrode body 300a (and thus first terminal 350), or a second bus 410b associated with the separate charging electrode 330 (and thus second terminal 360 through charging electrode switch 380). In an embodiment, electrode body switches 400b-e may be characterized as Single Pole, Double Throw. In some embodiments, electrode body switches 400b-e may have three alternative settings, such that each electrode body 300b-e may be electrically connected to electrode body 300a (and first terminal 350), separate charging electrode 330, or disconnected from both electrode body 300a and separate charging electrode 330. In an embodiment, such electrode body switches 400b-e may be characterized as Single Pole, Triple Throw. As shown, by connecting each of electrode bodies 300b-e to either the first bus 410a or the second bus 410b, each of the permeable electrode bodies 300b-e may either be part of the fuel electrode, or the charging electrode, by being electrically connected to the first terminal 350 or the second terminal 360 respectively.

As the illustrated embodiment further shows, the switches of the switching system 340 may be controlled by a controller 420, which may be of any suitable construction and configuration, and while in some embodiments may be mounted to the cell cover 180, such as by the circuitry mounts 240, in other embodiments may be remote from the cell assembly 290. In an embodiment, the controller 420 may be configured to manage application of the anodic potential from the power supply PS to permeable electrode bodies 300b-3 and the charging electrode 330. The controller 420 may cause electrodeposition of metal fuel, through reduction of reducible ions of the metal fuel from the ionically conductive medium, to progressively grow from permeable electrode body 300a to each subsequent electrode body 300b-e for application of a cathodic potential to each subsequently connected electrode body 300b-d. The controller 420 may also cause removal of the anodic potential from each subsequently connected electrode body, and may cause application of the anodic potential to at least the subsequent electrode body unconnected by the electrodeposition, or the charging electrode 330 where the last electrode body (i.e. electrode body 300e) has been electrically connected by the electrodeposition to the prior electrode bodies 300a-d. Such application of the anodic potential may be configured to permit or cause oxidization of an oxidizable species of the oxidant.

In an embodiment, the controller 420 may comprise circuitry configured to manipulate the switches of switching system 340 based on an input 430 to determine the proper switch configuration. In some embodiments, the input 430 may be instructions to control the controller 420, external readings or measurements regarding the cell that may influence the operation of the switching system 340, or so on. The controller 420 may also include a microprocessor for executing more complex decisions, as an option. In some embodiments, the controller 420 may also function to manage connectivity between the load L and the power source PS and the first and Nth cells. In some embodiments, the controller 420 may include appropriate logic or circuitry for actuating the appropriate bypass switches 370 in response to detecting a voltage reaching a predetermined threshold (such as drop below a predetermined threshold).

In some embodiments, the controller 420 may further comprise or be associated with a sensing device 440, including but not limited to a voltmeter (digital or analog) or potentiometer or other voltage measuring device or devices, that can be used to determine when to modify the configuration of the plurality of switches, such as to maintain the proximity of the anode and the cathode as fuel growth progresses during charging. In some embodiments, the sensing device 440 may instead measure current, resistance, or any other electrical or physical property across or of the cell assembly 290 that may be used to determine when to modify the configuration of the plurality of switches. For example, the sensing device 440 may measure a spike in current or a drop in potential difference between two electrode bodies. In some embodiments, the controller 420 may control the switches of the switching system 340 based on the passage of increments of time. For example, in an embodiment the time for fuel growth to progress between adjacent electrode bodies may be known, and used to calculate when to operate the switching system 340 so as to progressively rewire the electrodes to maintain an adjacent separation between the anode and the cathode, or provide for parallel versus progressive charging, as is described in greater detail in U.S. patent application Ser. No. 13/230,549 and U.S. patent application Ser. No. 13/299,167, incorporated herein by reference in their entireties. In an embodiment, the controller 420 may control the switches of switching system 340 to provide a high efficiency mode for the cell, such as is disclosed in U.S. patent application Ser. No. 13/083,929, incorporated in its entirety herein by reference.

As noted above, in an embodiment, the controller 420 may be configured to control the bypass switch 370 to bypass the cell assembly 290. In various embodiments, the bypass switch 370 may be closed for any number of reasons, including based on readings regarding the cell made by sensing device 440, or based on external commands fed into the controller 420 via the input 430. In an embodiment, the controller 420 may coordinate with other controllers 420 associated with other cell assemblies 290, and may programmatically control the other controllers 420 to network control of the cells assemblies 290. In an embodiment, a master controller may be provided to control a plurality of the controllers 420, providing the ability to control the operation of the switching system 340 for a plurality of cells assemblies 290. In an embodiment, the controller 420 may implement an algorithm, such as but not limited to one similar to those disclosed in U.S. patent application Ser. No. 13/299,167, or implement other computer or programmatic control for the switching system 340.

Figure 13:
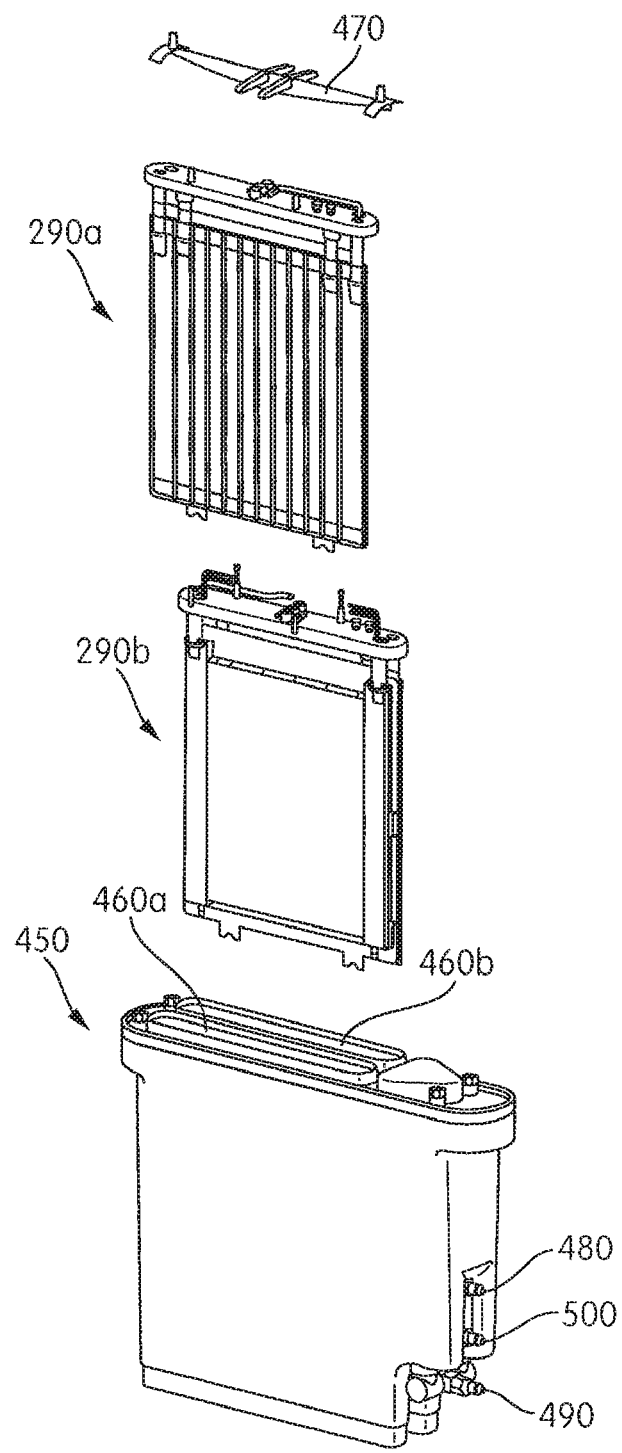
FIG. 13 depicts a pair of cell assemblies aligned for immersion into an ionically conductive medium module.

Turning to FIG. 13, a pair of cell assemblies 290 (individually cell assembly 290a and cell assembly 290b are positioned for insertion into an ionically conductive medium module 450 that is configured to house an amount of ionically conductive medium that the cell assemblies 290 may be immersed into to form electrochemical cells. While in the illustrated embodiment the ionically conductive medium module 450 is configured to receive a pair of cell assemblies 290, in other embodiments the ionically conductive medium module 450 may be configured to receive any number of cell assemblies 290. In the illustrated embodiment, the ionically conductive medium module 450 receives each cell assembly 290 into an associated receiving slot 460. For example, cell assembly 290a may be received by receiving slot 460a, while cell assembly 290b may be received by receiving slot 460b. Once the cell assemblies 290 are received by their receiving slots 460, as discussed in greater detail below, a cell retainer 470 may engage the cell assemblies 290, to lock them into the ionically conductive medium module 450.

Although in some embodiments the ionically conductive medium module 450 may simply hold an amount of ionically conductive medium in a constant pool, in the illustrated embodiment the ionically conductive medium module 450 is configured to flow ionically conductive medium therein, between a fluid inlet 480 and a fluid outlet 490, as discussed in greater detail below. While in some embodiments, the ionically conductive medium in the ionically conductive medium module 450 may be common across receiving slots 460, in some embodiments, such as that illustrated, each receiving slot 460 may be physically separated from the other, such as by manifolds or the like, so that ionically conductive medium is held or flows in parallel through them.

As the ionically conductive medium is electrically conductive, the flow of ionically conductive medium through multiple electrochemical cells may cause shunt current, the parasitic or counter-productive current that flows through the ionically conductive medium between electrodes of different cell assemblies 290 housed in the same ionically conductive medium module 450, reducing an overall potential difference across a plurality of electrochemical cells. Physical separation of the ionically conductive medium may serve to disrupt the shunt current, by breaking the counter-productive electrical connections formed in the ionically conductive medium, creating at least some current isolation. To physically separate the ionically conductive medium between the cell assemblies 290, each receiving slot 460 may include one or more flow dispersers, such as those described in U.S. patent application Ser. No. 13/362,775, filed Feb. 4, 2011, incorporated herein in its entirety by reference, as described in greater detail below. As such, a disperser gaseous oxidant inlet 500 may be provided on the ionically conducive medium module 450 in some embodiments, as shown.

Figure 14:
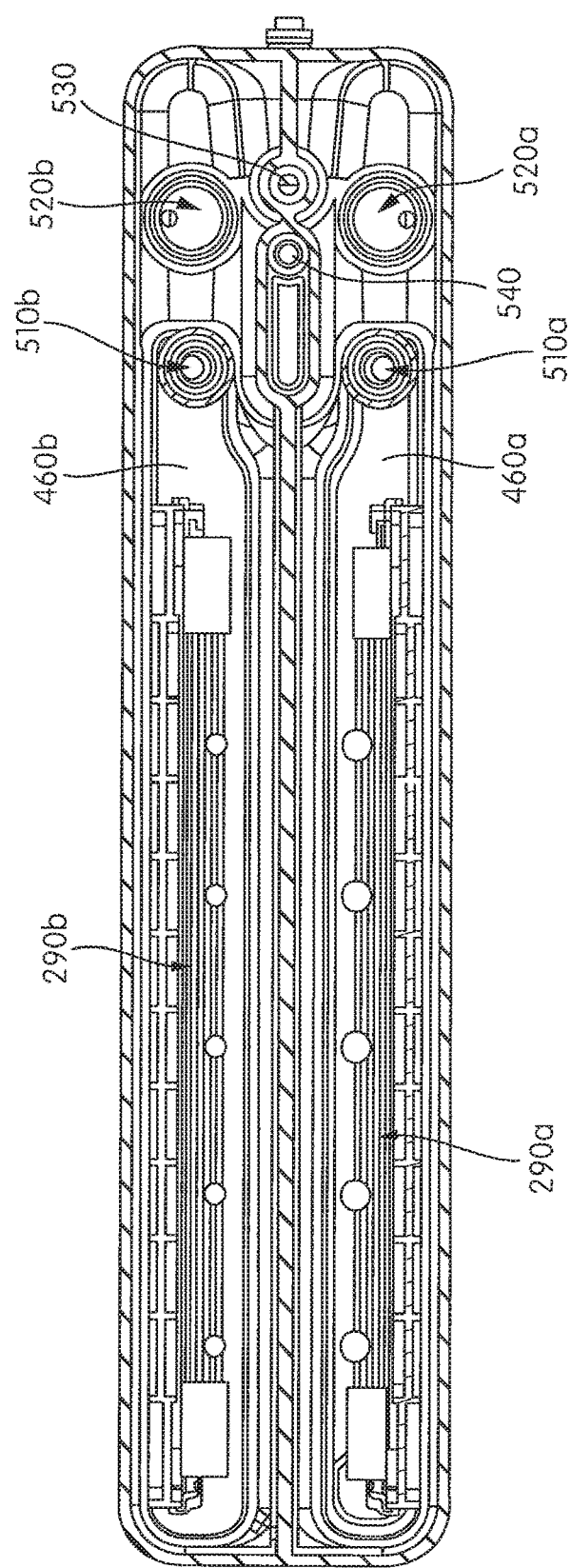
FIG. 14 depicts a cross sectional view of the pair of cell assemblies as immersed into the ionically conductive medium module, cutting across pairs of disperser chambers associated with each cell assembly.

In FIG. 14, a cross sectional view of the ionically conductive medium module 450 is depicted cut across receiving slots 460a and 460b. In the illustrated embodiment, instead of the ionically conductive medium being common for both of the cell assemblies 290, each receiving slot 460 contains its own associated inlet disperser chamber 510 (individually inlet disperser chambers 510a and 510b) and outlet disperser chamber 520 (individually outlet disperser chambers 520a and 520b), to electrically isolate the ionically conductive medium associated with each receiving slot 460. Shown in the cross sectional view of the illustrated embodiment is a fluid inlet path 530 that leads from the fluid inlet 480 to a fluid inlet manifold (not shown) that divides the ionically conductive medium flowing therein to each of the inlet disperser chambers 510a and 510b. Although such a fluid inlet manifold would lead to the ionically conductive medium flowing in parallel between receiving slots 460a and 460b, in some embodiments the flow may be in series between receiving slots 460a and 460b, such that the flow enters inlet disperser chamber 510a, flows through receiving slot 460a, enters inlet disperser chamber 510b, and departs outlet disperser chamber 520b. Other flow configurations are possible as well. In the illustrated embodiment, however, a disperser gaseous oxidant path 540, that leads to a disperser gaseous oxidant manifold (not shown), provides gaseous oxidant to at least the inlet disperser chambers 510a and 510b, as described below.

Figure 15:
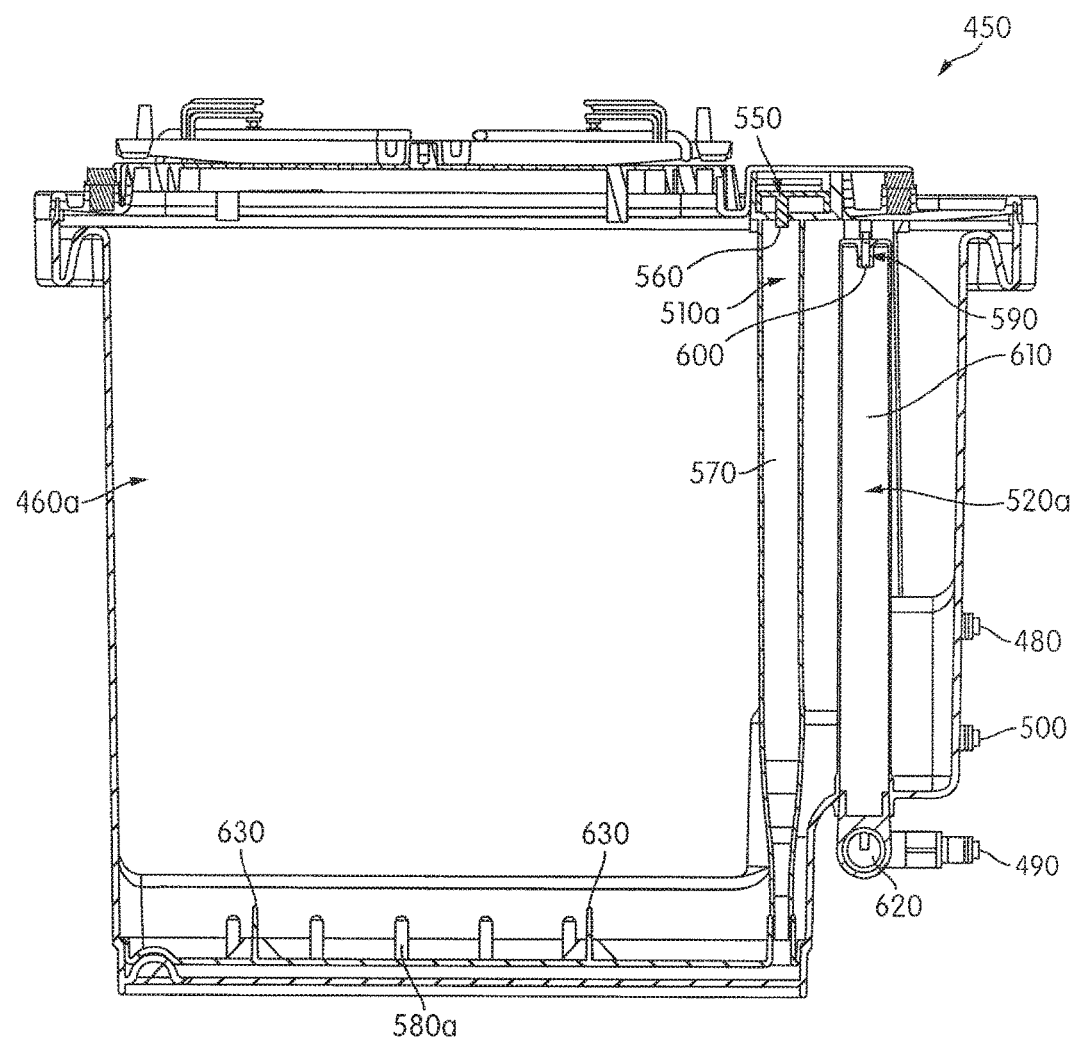
FIG. 15 depicts another cross sectional view of the ionically conductive medium module, cutting across the pair of disperser chambers associated with one of the cell assemblies.

In FIG. 15, a cross sectional view of the ionically conductive medium module 450 along the receiving slot 460a is presented, showing the interior of the inlet disperser chamber 510a and the outlet disperser chamber 510b. From this view, it may be appreciated that as ionically conductive medium flows into the fluid inlet 480, it may flow upwards (i.e. against the force of gravity) so that gravity can assist in the dispersal of the ionically conductive medium in the inlet disperser chambers 510. The fluid inlet manifold (again not shown), that divides the flow to inlet disperser chambers 510a and 510b, may be positioned anywhere between the fluid inlet 480 and the inlet disperser chambers 510.

Although the dispersion of the ionically conductive medium described herein will be with reference to the ionically conductive medium flowing through receiving slot 460a, a similar flow path may be associated with receiving slot 460b. In the illustrated embodiment, the inlet disperser chamber 510a contains a flow disperser 550 configured to break up the flow of the ionically conductive medium by passing it through one or more nozzles 560. In an embodiment, flow disperser 550 will be positioned at a terminal end of the fluid inlet path 530, so that the ionically conductive medium will fall downward through the one or more nozzles 560, and, in a dispersed form through a post-dispersion portion 570 of the inlet dispersion chamber 510a. By dispersing the ionically conductive medium, any electrical current, such as shunt current, that could otherwise flow through the ionically conductive medium would be broken, preventing or minimizing the influence of such currents between fluidly connected cell assemblies 290.

In some embodiments, including that illustrated in FIG. 15, gaseous oxidant from the disperser gaseous oxidant inlet 500 may traverse the gaseous oxidant path 540 until it reaches the disperser gaseous oxidant manifold (not shown), and enters the disperser chamber gaseous oxidant inlet (also not shown). In some embodiments, the disperser chamber gaseous oxidant inlet may simply be an isolated and dedicated one of the nozzles 560, while in other embodiments it may be located elsewhere at an upper portion of the inlet disperser chamber 510. The gaseous oxidant may be under pressure, so as to reduce the tendency of the ionically conductive medium to foam at the base of the post-dispersion portions 570 of the inlet dispersion chambers 510. In some embodiments, the pressure of the gaseous oxidant from the disperser gaseous oxidant inlet 500 may form a pressure head within the ionically conductive medium module 450, so as to permit an upward flow (i.e. against the force of gravity) of the ionically conductive medium in the receiving slots 460 of the ionically conductive medium module 450.

After the ionically conductive medium is dispersed in the post-dispersion portion 570, it may gather at the bottom of the inlet disperser chamber 510a, such that it may continue to flow through the receiving slot 460a, across the cell assembly 290a immersed therein. As is shown in FIG. 15, at the bottom of receiving slot 460a there may be a receiving slot manifold 580a, that may divide and guide the flow of the ionically conductive medium across the cell assemblies 290, such as between the electrode bodies 300 and across the oxidant reduction electrode 20. In some embodiments, the receiving slot manifold 580a may guide the flow of the ionically conductive medium into each of the flow lanes 320 of the fuel electrode 170. Once the ionically conductive medium reaches the top of the receiving slot 460a, it may flow into the outlet disperser chamber 520a associated therewith. Although in some embodiments a manifold may be located at the top of each receiving slot 460, to recombine the flows from the flow lanes 320 of the fuel electrode 170, in other embodiments the flows may merely be guided within the receiving slots 460, and not consistently directed by discrete flow paths at all times. In some embodiments, the top of the outlet disperser chamber 520a may be positioned lower than the top of the receiving slot 460a, so9 that the ionically conductive medium may enter it via the force of gravity.

As shown, the outlet dispersion chamber 520a may include a flow disperser 590 configured to break up the flow of the ionically conductive medium by passing it through one or more nozzles 600, so that the ionically conductive medium is dispersed as it falls into a post-dispersion chamber 610 of the outlet disperser chamber 520. In some embodiments, the outlet disperser chambers 520 may be of a similar construction and configuration as inlet disperser chambers 510. For example, in some embodiments the outlet disperser chambers 520 may further include disperser gaseous oxidant inlets (not shown) that may be configured to receive gaseous oxidant from the disperser gaseous oxidant inlet 500 into the post-dispersion chamber 610. Likewise, the flow disperser 590 and the nozzles 600 may be similar to the flow disperser 550 and the nozzles 560 respectively. In other embodiments, however, flow against the force of gravity might not be needed once the ionically conductive medium reaches the top of the receiving slots 460, in which case the outlet disperser chamber 520a may be configured to receive the "overflow" of ionically conductive medium as it leaves the receiving slot 460a, wherein it may drain out of the outlet disperser chamber 520a once it recombines at the bottom of the post-dispersion chamber 610. In some such embodiments, the disperser gaseous oxidant inlets might not be needed, as there would be no need to maintain the pressure head following the nozzles 600, nor would the ionically conductive medium generally foam, bubble, or otherwise back up within the outlet disperser chambers 520. Regardless, in some embodiments, such as that illustrated, the ionically conductive medium dispersed by the outlet disperser chamber 520a may recombine with the ionically conductive medium dispersed by the outlet disperser chamber 520b (obscured in FIG. 15) in a fluid outlet manifold 620, so that the recombined ionically conductive medium may jointly flow out of the fluid outlet 490.

As noted above, the support tabs 54 may be utilized to position the oxidant reduction electrode module 10 when it is immersed in the ionically conductive medium. Further shown in the embodiment of FIG. 15 are support tab positioning members 630 that may engage the support tabs 54 on the oxidant reduction electrode module 10, so as to assist in positioning the cell assembly 290 in the receiving slot 460. In an embodiment, the support tabs 54 may contain a groove therein that may receive each positioning member 630, so as to hold the cell assembly 290 at a certain height relative to the receiving slot manifold 580, and may support some of the weight of the cell assembly 290 as it is immersed in the ionically conductive medium. Although in the illustrated embodiment the support tabs 54 extend from the mounting frame 50, in other embodiments containing the support tabs 54, they may extend from other areas of the housing 30, or may be located elsewhere on the cell assembly 290. Furthermore, other mechanisms for aligning the oxidant reduction electrode module 10 are also possible, including but not limited to grooves formed in the housing 30 that may receive alignment tabs within the ionically conductive medium module 450. The positioning members described herein are only exemplary, and other positioning members may additionally or alternatively be provided, or may be omitted outright.

Figure 16:
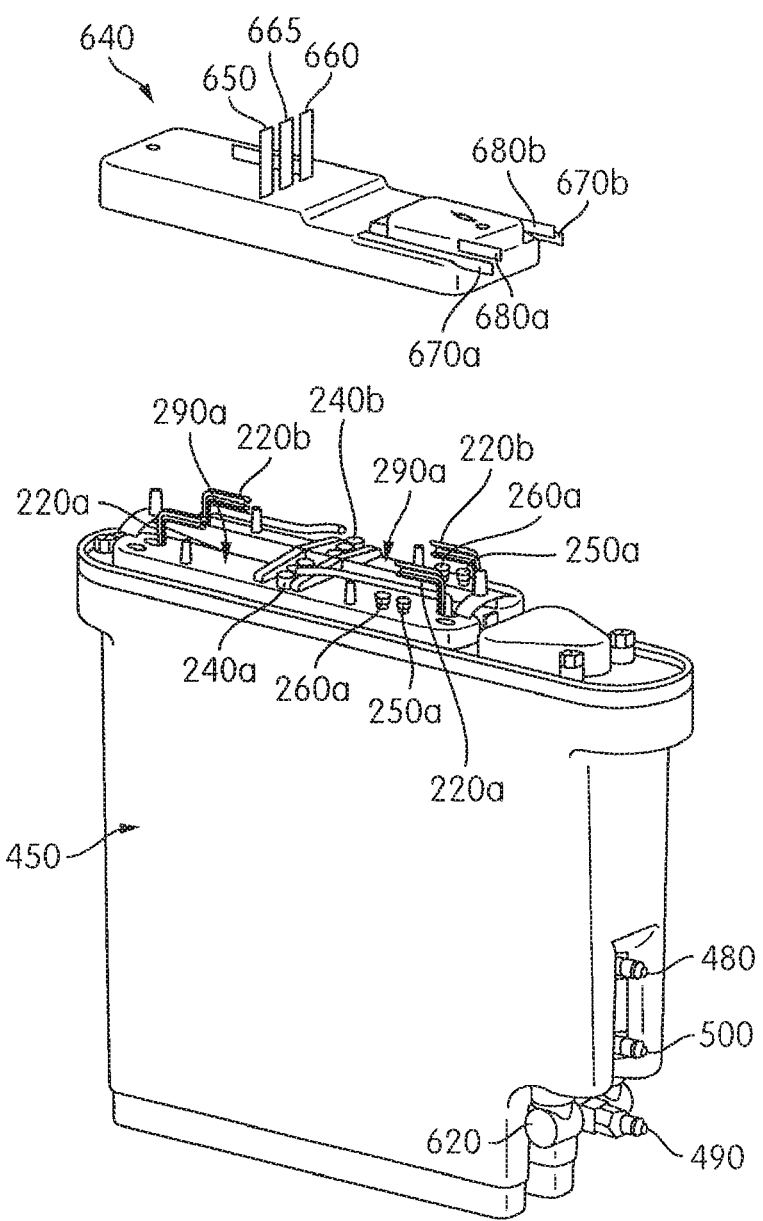
FIG. 16 depicts a circuitry module configured to engage the cell assemblies as immersed into the ionically conductive medium module.

In FIG. 16, a perspective view of the ionically conductive medium module 450 with the cell assemblies 290a and 290b installed therein is shown, with a circuitry module 640 above configured for mounting to the circuitry mounts 240. In an embodiment, the circuitry module 640 may receive the conductors 220 electrically coupled to the fuel electrodes 170, and the conductors 150 electrically coupled to the oxidant reduction electrodes 20, for each of the cell assemblies 290a and 290b in the ionically conductive medium module 450. In some embodiments, a single circuitry module 640 may be associated with each cell assembly 290, while in other embodiments, such as that shown, the circuitry module 640 may be associated with multiple cell assemblies 290. In an embodiment, the circuitry module 640 may contain therein the switching system 340 described above. The circuitry module 640 may also contain therein the controller 420 and a connector for the input 430. In other embodiments, however, the circuitry module 640 may merely contain connectors that connect to the controller 420 located remotely. As shown in the illustrated embodiment, the circuitry module 420 may contain thereon a first terminal 650 and second terminal 660, which may be common for both cells formed from cell assembly 290a and cell assembly 290b, and may be linked in various embodiments in series or in parallel. For example, in some embodiments, the first terminal 650 may connect to the first terminal 350a of cell assembly 290a, while the second terminal 660 may connect to the second terminal 360b of the cell assembly 390b. In other embodiments, the first terminal 650 of the circuitry module 640 may be connected to both first terminals 350a and 350b of cell assemblies 290a and 290b respectively, while the second terminal 660 of the circuitry module 640 is connected to both second terminals 360a and 360b of the cell assemblies 290a and 290b respectively. In some embodiments, such as that illustrated, an intermediate terminal 665 may be provided that allows for electrical connection between the first cell assembly 290a and the second cell assembly 290b. The intermediate terminal 665 may be useful so that either cell in the ionically conductive medium module 450 may be selectively excluded manually, outside of or in conjunction with utilizing the bypass switch 370 described above, for example.

Further shown on the circuitry module 640 are oxidant inlet connectors 670 and oxidant outlet connectors 680 for each cell assembly 290. Specifically, in the illustrated embodiment there are oxidant inlet connectors 670a and 670b that couple to the cell cover gaseous oxidant inlets 250a and 250b of cell assemblies 290a and 290b respectively to provide a path for the gaseous oxidant into the gaseous oxidant space of the oxidant reduction electrode modules 10 through the circuitry module 640. Likewise, the illustrated embodiment depicts oxidant outlet connectors 680a and 680b that couple to the cell cover gaseous oxidant outlets 260a and 260b of cell assemblies 290a and 290b respectively to provide a path for the gaseous oxidant out of the gaseous oxidant space of the oxidant reduction electrode modules 10 through the circuitry module 640. Although in the illustrated embodiment there are separate oxidant inlet connectors 670 and oxidant outlet connectors 680 for each cell assembly 290, in some embodiments any two or more of the oxidant inlet connectors 670 and the oxidant outlet connectors 680 may be connected together, either within or outside the circuitry module 640, to create either a parallel or serial gaseous oxidant flow connection through the oxidant reduction electrode modules 10. For example, in an embodiment a single oxidant inlet connector 670a may be provided to supply gaseous oxidant into gaseous oxidant inlet 250a, while the circuitry module 640 may be configured to couple the gaseous oxidant outlet 260a to the gaseous oxidant inlet 250b. A single oxidant outlet connector 680b may then be provided, configured to be coupled to the gaseous oxidant outlet 260b, so that the gaseous oxidant would flow in series, first through oxidant reduction electrode module 10a, then through oxidant reduction electrode module 10b.

Figure 17:
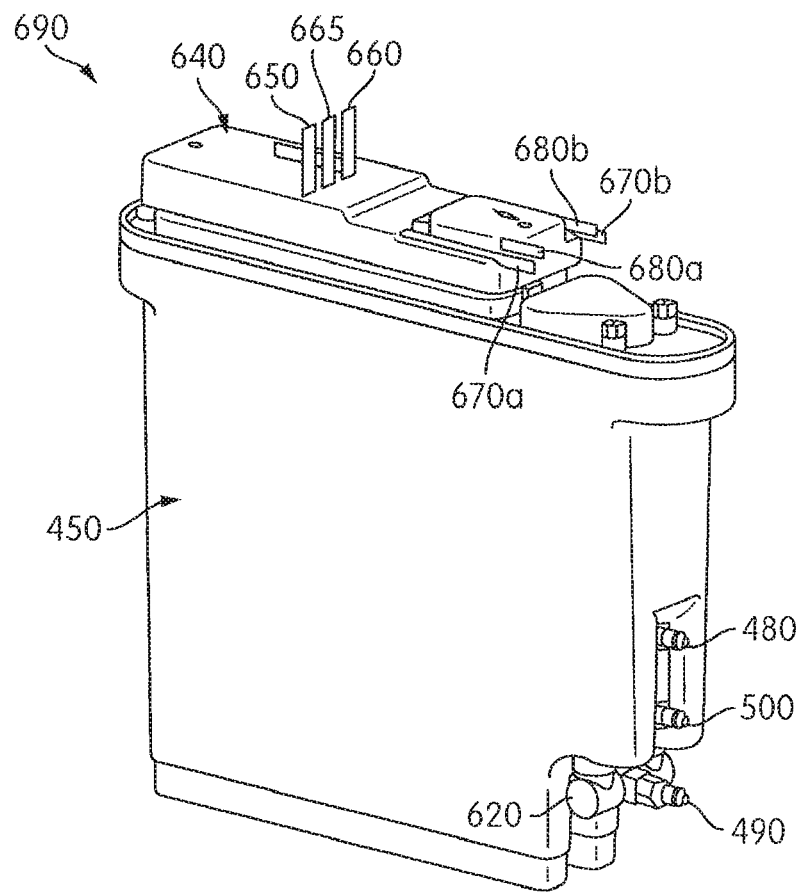
FIG. 17 depicts a completed cell module formed when the circuitry module is assembled onto the pair of cell assemblies immersed into the ionically conductive medium module.

Depicted in FIG. 17 is a completed cell module 690 that includes the ionically conductive medium module 450, the cell assemblies 290a and 290b, and the circuitry module 640 thereon. In some embodiments, the ionically conductive medium flowing into the fluid inlet 480 and out of the fluid outlet 490 may be generally stored in a reservoir R (not shown), and a flow pump FP (also not shown) may be used to pump the ionically conductive medium through one or more of the cell modules 690. In some embodiments, a plurality of fluid inlets 480 may be fluidly connected to one another by a manifold connection, so that the flow pump FP may drive the flow through each of the cell modules 690 in parallel. In other embodiments (i.e. where a pressure head is maintained in the outlet disperser chambers 520, and thus at the flow outlet 490), the flow outlet 490 of a prior cell module 690 may be fluidly connected to the flow inlet 480 of a subsequent cell module 690, so that the ionically conductive medium flows from the reservoir R through each cell module 690 in series. In some embodiments, the cell modules 690 may be fluidly connected in combinations of series and parallel flows. In some embodiments, each cell module 690 may contain its own flow pump FP. In some embodiments, each cell module 690 may be configured to recirculate its own set supply of ionically conductive medium therein, and thus the flow outlet 490 may lead directly into a flow pump FP, that leads directly back into the flow outlet 480 of the same cell module 690.

In some embodiments, one or more of the oxidant inlet connectors 670 may be connected to an oxidizer source. While in some embodiments the oxidizer source may be the ambient gaseous oxidant, in other embodiments a gaseous oxidant pump AP may be provided to create a flow of gaseous oxidant or other oxidant through the gaseous oxidant path defined in the oxidant reduction electrode modules 10. As with the fluid path from the flow pump FP, the gaseous oxidant path of the gaseous oxidant pump AP may be connected to the oxidant reduction electrode connectors 670 in series or in parallel. In some embodiments, one or more gaseous oxidant pumps AP may be embedded within the circuitry module 640, and may draw gaseous oxidant through the oxidant inlet connectors 670, and out of the oxidant outlet connectors 680. In some embodiments, one or more of the gaseous oxidant pumps AP may be located anywhere along the gaseous oxidant path, and may create a flow of gaseous oxidant or other oxidant by pulling or pushing the gaseous oxidant to create the flow. The gaseous oxidant pumps AP may be of any suitable construction or configuration, including but not limited to axial fans, centrifugal fans, crossflow fans, or so called "bladeless fans."

In some embodiments the same gaseous oxidant pump AP that provides oxidant to the oxidant reduction electrode modules 10 may additionally provide gaseous oxidant to the gaseous oxidant dispersers via the disperser gaseous oxidant inlet 500. In other embodiments, a disperser gaseous oxidant pump DAP (also not shown), separate from the gaseous oxidant pump AP, may provide gaseous oxidant to the disperser gaseous oxidant inlet 500, which in some embodiments may be at a greater pressure than the gaseous oxidant provided to the oxidant reduction electrode modules 10. For example, in an embodiment the gaseous oxidant pump AP may provide an increase in pressure of approximately ¼ PSI above atmospheric pressure to the oxidant facing side 45 of the oxidant reduction electrode 20, which may provide a force perpendicular to the oxidant reduction electrode 20, which among other things may assist in balancing the force of the ionically conductive medium on the ionically conductive medium facing side 40 of the oxidant reduction electrode 20. Likewise, in an embodiment the disperser gaseous oxidant pump DAP may provide an increase in pressure of approximately ½ PSI above atmospheric pressure into the disperser gaseous oxidant inlet 500, which would then be provided to at least the inlet disperser chambers 510 (and in some embodiments the outlet disperser chambers 520). The pressures provided by the gaseous oxidant pump AP and/or the disperser gaseous oxidant pump DAP may vary across embodiments, and thus any appropriate pressurization (if any at all) may be utilized.

In some embodiments the oxidizer source for the oxidant reduction electrode modules 10 may be a contained source of oxidizer (such as, for example, an oxygen tank). In an embodiment, oxygen may be recycled from the electrochemical cell, such as is disclosed in U.S. patent application Ser. No. 12/549,617, incorporated in its entirety herein by reference. Likewise, when the oxidizer is oxygen from ambient gaseous oxidant, the oxidizer source may be broadly regarded as the delivery mechanism, whether it is passive or active (e.g., pumps, blowers, etc.), by which the gaseous oxidant is permitted to flow to the oxidant reduction electrode 20. Thus, the term "oxidizer source" is intended to encompass both contained oxidizers and/or arrangements for passively or actively delivering oxygen from ambient gaseous oxidant to the oxidant reduction electrode 20.

In various embodiments, the configuration of the oxidant reduction electrode module 10 and its alignment with the fuel electrode module 160, may vary from that illustrated herein. For example, in some embodiments the oxidant reduction electrode module 10 may contain a pair of opposing oxidant reduction electrodes 20, configured to be aligned between a pair of opposing fuel electrodes 170. In some such embodiments, the baffles 158 may extend into the gaseous oxidant space from the top portion 60 and the bottom portion 90 of the module 30, wherein a pair of the mounting plates 50 housing the oxidant reduction electrode modules 10 surround the baffles 158, to define a gaseous oxidant channel from the gaseous oxidant inlet 120 to the gaseous oxidant outlet 130 that allows the gaseous oxidant to contact both oxidant reduction electrodes 20. In some embodiments, the pair of fuel electrodes 170 separated by the oxidant reduction electrode module 10 having a pair of oxidant reduction electrodes 20 therein may share shares ionically conductive medium (i.e. the oxidant reduction electrode module 10 and both fuel electrodes 20 are immersed in the same ionically conductive medium). Likewise, either or both of the fuel electrodes 170 may be coupled to the oxidant reduction electrode module 10, as described above. In some embodiments, a pair of oxidant reduction electrode modules 10 may surround a common fuel electrode 170 therebetween, or a pair of conjoined fuel electrodes 170 therebetween, and in some embodiments may form a bicell similar to those described in U.S. patent application Ser. No. 13/362,775, already incorporated herein by reference.

As indicated above, in some embodiments the baffles 158 or other support structure within the air space may generally facilitate an easing or other distribution of the forces of the liquid ionically conductive medium on the oxidant reduction electrode 20, by providing a generally rigid support structure for the oxidant reduction electrode 20 in the gaseous oxidant space. It may be appreciated that the materials that are assembled into the oxidant reduction electrode 20 may generally be less rigid than the materials of the housing 30, and as such, may have a tendency to bow into the gaseous oxidant space between the baffles 158, under the fluid pressure of the ionically conductive medium, when immersed therein. Such bowing may have a number of adverse effects, including but not limited to putting strain on adhesive securing the oxidant reduction electrode 20 to the mounting frame 50, and distorting the electrical field between the oxidant reduction electrode 20 and the fuel electrode 170. Accordingly, it may be appreciated that the baffles 158 may be positioned in the gaseous oxidant space so as to support regions of the oxidant reduction electrode 20 to reduce the tendency of the oxidant reduction electrode 20 to bend under the fluid force.

Figure 18:
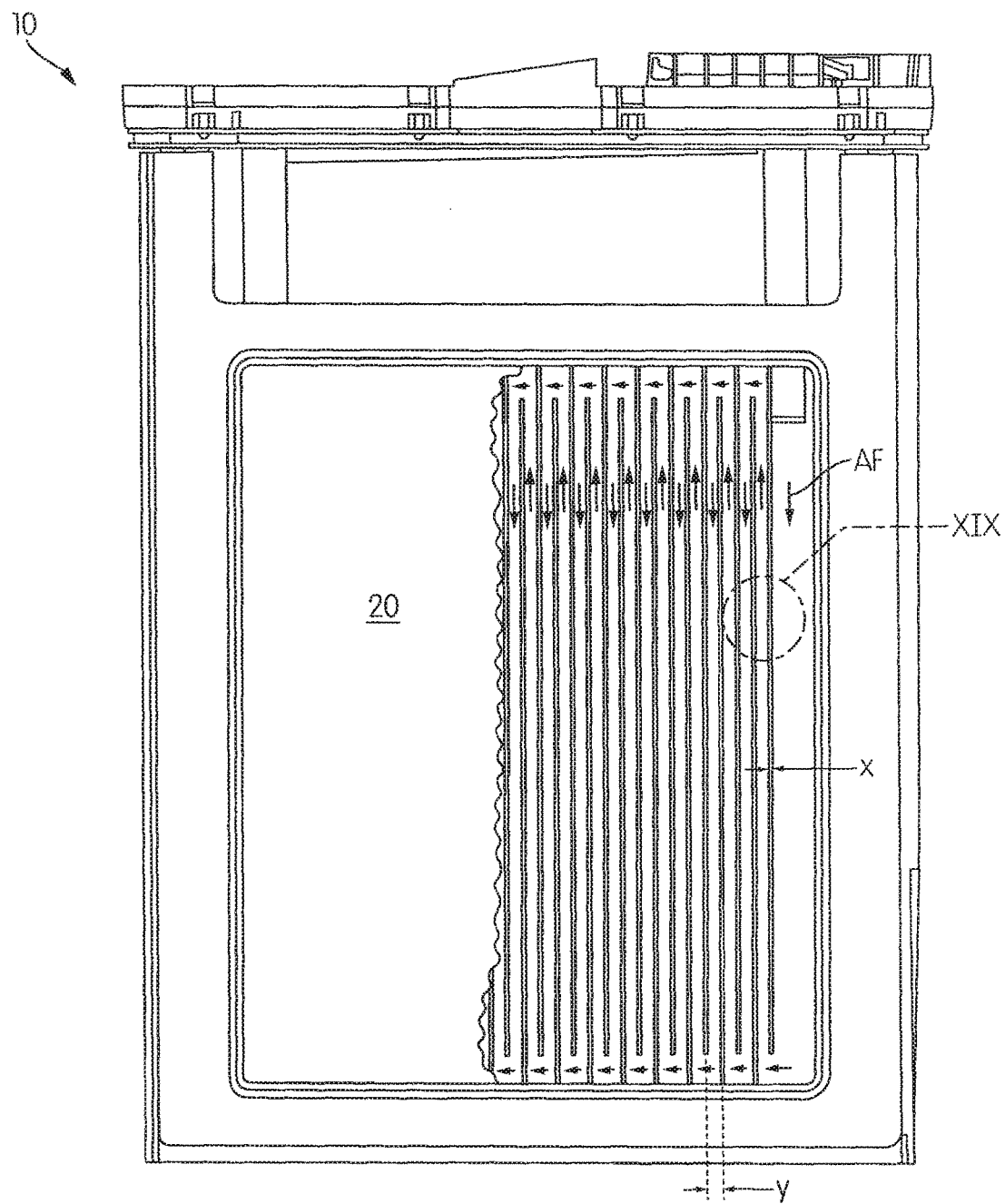
FIG. 18 depicts a view of an oxidant reduction electrode module facing the oxidant reduction electrode, with a portion of the oxidant reduction electrode removed to illustrate a dense configuration of baffles that form the gaseous oxidant flow path therein, to provide additional support for the oxidant reduction electrode when immersed in the ionically conductive medium.

Shown in FIG. 18, for example, is an embodiment of the oxidant reduction electrode module 10 illustrating a generally dense arrangement of the baffles 158, so as to narrow the air channel defined therebetween, to direct an air flow AF therethrough in the direction illustrated by the arrows. With such a denser arrangement of the baffles 158, regions into which the oxidant reduction electrode 20 may otherwise bend under the fluid force are reduced as greater support is provided. Additionally, it may be appreciated that in an embodiment, the baffles 158 may themselves be sufficiently thick so as to provide further support for the oxidant reduction electrode 20, as described in greater detail below. In some embodiments, the thickness of the baffles 158 and the spacing therebetween may be proportional to one another so as to maximize support of the oxidant reduction electrode 20 while also maximizing air flow through the air channels, and exposure of the oxidant reduction electrode 20 to the air or other gaseous oxidant.

Although non-limiting, in the illustrated embodiment of FIG. 18, a thickness x of the baffles 158 may be approximately 1 mm in width. Additionally, in the illustrated embodiment, the spacing y between the baffles 158 may be approximately 2 mm in width. In other embodiments, the thickness x and the spacing y may vary, and may depend on the relative rigidity of the oxidant reduction electrode 20. For instance, where the oxidant reduction electrode 20 is of a generally rigid or reinforced nature, a wider spacing y of the baffles 158 may be utilized. As an example, in some embodiments, the spacing y of the baffles 158 may be approximately between 1-50 mm, such as, in an embodiment, approximately 20 mm, approximately 10 mm, or approximately 5 mm. Likewise, the thickness x of the baffles 158 may in some embodiments be approximately between 0.5 and 10 mm, such as, in an embodiment, approximately 5 mm, or approximately 2 mm.

Figure 19:
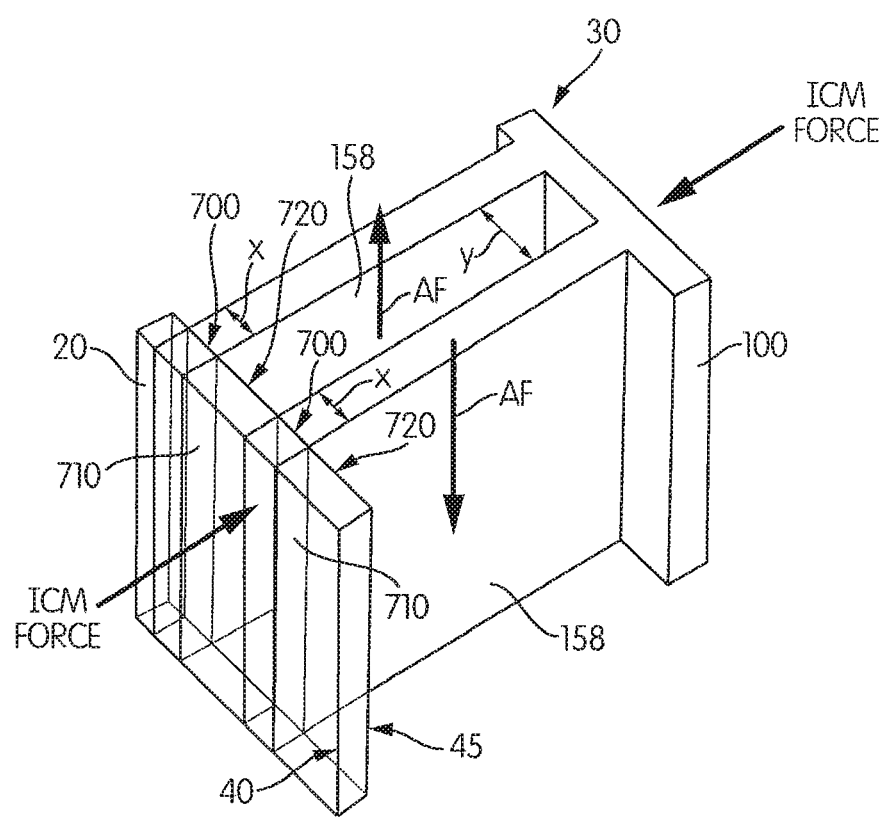
FIG. 19 depicts a reduced cross-sectional perspective view of a portion of the oxidant reduction electrode and the gaseous oxidant flow path from FIG. 18, illustrating a balancing of forces applied by the ionically conductive medium by the baffles.

FIG. 19 depicts a reduced cross sectional perspective view of region XVIII highlighted in the embodiment of FIG. 18. Again, the baffles 158 may be configured to separate different directions of air flow AF (i.e. in the air channel through the oxidant reduction electrode module 10). As may be appreciated in the view of FIG. 19, hydrostatic pressure exerted by the ionically conductive medium against the oxidant reduction electrode 20 (shown transparently to illustrate contact with the baffles 158) may be balanced by opposing ionically conductive medium force passing through the baffles 158 from the back portion 100 of the housing 30. As such, the ionically conductive medium force into the ionically conductive medium facing side 40 of the oxidant reduction electrode 20 may press supported regions 700 of the oxidant facing side 45 of the oxidant reduction electrode 20 into contacting faces 710 of the baffles 158, which are themselves receiving opposing ionically conductive medium forces from the ionically conductive medium pressing into the back portion 100 of the housing 30. Thus, the ionically conductive medium forces may be neutralized through the length of the baffles 158, limiting distortion of the oxidant reduction electrode 20 into the air channels in those supported regions 700. Additionally, reducing the effects of hydrostatic pressure may prevent increased rates of egress of electrolyte through the oxidant reduction electrode 20. Binders such as PTFE may gradually change pore size under a pressure, which may otherwise cause egress of ionically conductive medium into the air space of the oxidant reduction electrode module to the air channels between the baffles 158. Therefore, by reducing the effect of hydrostatic pressure, the lifetime of the oxidant reduction electrode 20 may be increased.

Again, the spacing y between the baffles 158 may be sized so that the baffles 158 provide sufficient support across the oxidant facing side 45 of the oxidant reduction electrode 20 as to limit or prevent distortion of the oxidant reduction electrode 20 between adjacent contacting faces 710 (i.e. in unsupported regions 720, as illustrated). It may be appreciated, however, that while in some embodiments the baffles 158 may be constructed of a dense material, in other embodiments at least a portion of the baffles 158 proximal to the contacting faces 710 may themselves be generally air permeable, so as to facilitate absorption of the gaseous oxidant at those supported regions 700 of the oxidant reduction electrode 20. Likewise, in some embodiments the oxidant facing side 45 of the oxidant reduction electrode 20 is sufficiently air permeable that oxidant contacting the unsupported regions 720 pass into the oxidant reduction electrode 20 to provide the oxidant to the supported regions 700.

The embodiments of the electrochemical cells described herein should not be considered to be limiting in any way and are provided as non-limiting examples of how such cells utilizing the teachings described herein may be charged or discharged. U.S. patent application Ser. No. 12/885,268, filed on Sep. 17, 2010, the entire content of which is incorporated herein by reference, describes embodiments of a rechargeable electrochemical cell system with charge/discharge mode switching in the cells. As also noted above, the fluid connections between multiple electrochemical cells utilizing the cell assemblies 290 may vary. Additional details of embodiments of the cells that are connected in series are provided in U.S. patent application Ser. No. 12/631,484, filed Dec. 4, 2009, and incorporated herein by reference in its entirety.

Although a single ionically conductive medium module 450 is depicted herein, having two receiving slots 460 enclosed therein to receive two cell assemblies 290, creating the cell module 690, the present invention may be practiced with additional receiving slots 460 and cell assemblies 290, and/or with additional ionically conductive medium modules 450 fluidly connected to those illustrated, creating any size of battery of cells, or so on. Alternative and additional mechanisms to increase ionic resistance between fluidly connected cells may be utilized in the present invention, such as those discussed in U.S. patent application Ser. No. 12/631,484, incorporated herein by reference. In some embodiments, the cell assembly 290 and/or the ionically conductive medium modules 450 may contain one or more catch trays, such as those described in U.S. patent application Ser. No. 13/185,658, incorporated herein in its entirety by reference, which may be strategically positioned to receive and oxidize particles of fuel that may separate from the fuel electrode 170. In some embodiments, the cell assembly 290 (including, for example, the oxidant reduction electrode module 10), or a portion of the ionically conductive medium module 450, may contain therein a gas vent, such as the gaseous oxidant permeable liquid impermeable gas vent described in U.S. Provisional Patent Application Ser. No. 61/515,749, incorporated herein in its entirety by reference, which may allow undesirable gasses within the cell to be vented away from the cell, including but not limited to into the immersed gaseous oxidant path.

It should be understood that in some embodiments additives or other materials may be applied to the ionically conductive medium or the electrodes. For example, to limit or suppress hydrogen evolution at the fuel electrode 170, which in some cases may occur during the discharge mode or during quiescent (open circuit) periods of time, salts may be added to retard hydrogen evolving reactions. Salts of stannous, lead, copper, mercury, indium, bismuth, or any other material having a high hydrogen overpotential may be used. In addition, salts of tartrate, phosphate, citrate, succinate, ammonium or other hydrogen evolution suppressing additives may be added. In an embodiment, metal fuel alloys, such as Al/Mg may be used to suppress hydrogen evolution. Additionally, other additives may also or alternatively be added to the ionically conductive medium, including, but not limited to additives which enhance the electrodeposition process of the metal fuel on the fuel electrode 170, such as is described in U.S. patent application Ser. No. 13/028,496, incorporated in its entirety herein by reference. Such additives may reduce the loose dendritic growth of fuel particles, and thus the likelihood of such fuel particles separating from the fuel electrode 170.

The foregoing illustrated embodiments have been provided solely for illustrating the structural and functional principles of the present invention and are not intended to be limiting. For example, the present invention may be practiced using different fuels, different oxidizers, different electrolytes, and/or different overall structural configuration or materials. As a non-limiting example, in some embodiments portions of the configuration of the electrochemical cell may include elements or arrangements from one or more of U.S. patent application Ser. Nos. 12/385,217, 12/385,489, 12/549,617, 12/631,484, 12/776,962, 12/885,268, 13/028,496, 13/083,929, 13/167,930, 13/185,658, 13/230,549, 13/299,167, 61/515,749, 61/555,982, and 61/556,011. Thus, the present invention is intended to encompass all modifications, substitutions, alterations, and equivalents within the spirit and scope of the following appended claims.

What is claimed is:

1. An oxidant reduction electrode module for immersion into an ionically conductive medium of an electrochemical cell, the oxidant reduction electrode module comprising:

a housing configured to define a gaseous oxidant receiving space therein;

an oxidant reduction electrode having an oxidant facing side and an ionically conductive medium facing side, the oxidant reduction electrode mounted to said housing such that the oxidant reduction electrode defines a boundary wall for the gaseous oxidant receiving space, with the oxidant facing side facing inwardly to the gaseous oxidant receiving space and the ionically conductive medium facing side facing outwardly for exposure to the ionically conductive medium;

a gaseous oxidant inlet and a gaseous oxidant outlet coupled by a gaseous oxidant channel extending through the gaseous oxidant receiving space; and one or more support members positioned within the gaseous oxidant receiving space, configured to prevent deformation of the oxidant reduction electrode into the gaseous oxidant receiving space when the oxidant reduction electrode is immersed into the ionically conductive medium, and direct a flow of gaseous oxidant within the gaseous oxidant channel from the gaseous oxidant inlet to the gaseous oxidant outlet; and wherein an oxidant is allowed into the gaseous oxidant receiving space via the gaseous oxidant inlet, the oxidant reduction electrode being configured to absorb the gaseous oxidant via the oxidant facing side and reduce the gaseous oxidant during discharge of the electrochemical cell.

2. The oxidant reduction electrode module of claim 1, wherein a gaseous oxidant path is formed between the gaseous oxidant inlet and the gaseous oxidant outlet through the gaseous oxidant receiving space by the one or more support members, and wherein the one or more support members are configured to direct a flow of gaseous oxidant within the gaseous oxidant path from the gaseous oxidant inlet to the gaseous oxidant outlet.

3. The oxidant reduction electrode module of claim 2, wherein portions of the one or more support members are spaced adjacent to one another, separated by a spacing defining a portion of the gaseous oxidant path.

4. The oxidant reduction electrode module of claim 1, wherein the one or more support members comprise baffles for the gaseous oxidant.

5. The oxidant reduction electrode module of claim 1, wherein the gaseous oxidant inlet and gaseous oxidant outlet are each configured to be connectable to respective connectors provided on a cell cover to establish respective inlet and outlet of the gaseous oxidant.

6. An oxidant reduction electrode module for coupling to a cell cover and immersion into an ionically conductive medium of an electrochemical cell, the oxidant reduction electrode module comprising:

a housing configured to define a gaseous oxidant receiving space therein;

an oxidant reduction electrode having an oxidant facing side and an ionically conductive medium facing side, the oxidant reduction electrode mounted to said housing such that the oxidant reduction electrode defines a boundary wall for the gaseous oxidant receiving space, with the oxidant facing side facing inwardly to the gaseous oxidant receiving space and the ionically conductive medium facing side facing outwardly for exposure to the ionically conductive medium;

a gaseous oxidant inlet and a gaseous oxidant outlet in communication with the gaseous oxidant receiving space;

an electrical conductor provided in a conductor channel, the gaseous inlet, or the gaseous oxidant outlet, and electrically connected to the oxidant reduction electrode; and wherein the gaseous oxidant inlet is configured to allow an oxidant into the gaseous oxidant receiving space, the oxidant reduction electrode is configured to absorb the gaseous oxidant via the oxidant facing side and reduce the gaseous oxidant during discharge of the electrochemical cell, and wherein the electrical conductor enables establishment of an electrical connection of the oxidant reduction electrode with circuitry in the cell cover.

7. The oxidant reduction electrode module of claim 6, wherein the electrical conductor is provided in a conductor channel that extends upwardly from the top of the housing and is connectable to a connector provided on the cell cover.

8. The oxidant reduction electrode module of claim 6, further comprising one or more support members positioned within the gaseous oxidant receiving space and configured to prevent deformation of the oxidant reduction electrode into the gaseous oxidant receiving space when the oxidant reduction electrode is immersed into the ionically conductive medium.

9. The oxidant reduction electrode module of claim 8, wherein a gaseous oxidant path is formed between the gaseous oxidant inlet and the gaseous oxidant outlet through the gaseous oxidant receiving space by the one or more support members, and wherein the one or more support members are configured to direct a flow of gaseous oxidant within the gaseous oxidant path from the gaseous oxidant inlet to the gaseous oxidant outlet.

10. The oxidant reduction electrode module of claim 9, wherein portions of the one or more support members are spaced adjacent to one another, separated by a spacing defining a portion of the gaseous oxidant path.

11. The oxidant reduction electrode module of claim 8, wherein the one or more support members comprise baffles for the gaseous oxidant.

12. The oxidant reduction electrode module of claim 6, wherein the gaseous oxidant inlet and gaseous oxidant outlet are each configured to be connectable to respective connectors provided on the cell cover to establish respective inlet and outlet of the gaseous oxidant.

13. The oxidant reduction electrode module of claim 6, wherein the housing is of a singular molded construction, is configured such that only a single seal is formed between the housing and the oxidant reduction electrode, and is to be immersed into the ionically conductive medium.

14. An assembly comprising the oxidant reduction electrode module of claim 6 coupled to a fuel electrode module containing a fuel electrode, the assembly configured to space the oxidant reduction electrode from the fuel electrode, so that, when immersed into the ionically conductive medium, the ionically conductive medium facing side of the oxidant reduction electrode and a metal fuel of the fuel electrode are exposed to the ionically conductive medium for electrochemically oxidizing the metal fuel, wherein the ionically conductive medium conducts ions between the fuel electrode and the ionically conductive medium facing side of the oxidant reduction electrode to support the electrochemical reactions between the oxidant reduction electrode and the fuel electrode.

15. The assembly of claim 14, further comprising the cell cover containing:

a cell cover gaseous oxidant inlet configured to couple to the gaseous oxidant inlet of the oxidant reduction electrode module so as to permit the flow of gaseous oxidant through the cell cover to the oxidant reduction electrode; and the circuitry for connection to the electrical conductor.

16. The assembly of claim 14, further comprising a second oxidant reduction electrode module comprising an associated oxidant reduction electrode, the second oxidant reduction electrode module positioned opposite the oxidant reduction electrode module, wherein the oxidant reduction electrode of the oxidant reduction electrode module faces the oxidant reduction electrode of the second oxidant reduction electrode module, with the fuel electrode positioned between the oxidant reduction electrode of the oxidant reduction electrode module and the oxidant reduction electrode of the second oxidant reduction electrode module.

17. The assembly of claim 14, further comprising a second fuel electrode positioned between the oxidant reduction electrode of the oxidant reduction electrode module and the oxidant reduction electrode of the second oxidant reduction electrode module, the fuel electrode being associated with the oxidant reduction electrode of the oxidant reduction electrode module, and the second fuel electrode being associated with the oxidant reduction electrode of the second oxidant reduction electrode module.

18. An electrochemical cell system comprising:
   a chamber configured to contain a quantity of ionically conductive medium therein;
   one or more fuel electrodes coupled to a cell cover, each comprising a metal fuel and configured to be contacted by the ionically conductive medium; and
   one or more oxidant reduction electrode modules according to claim 6 immersed into the ionically conductive medium and coupled to the cell cover.

19. The electrochemical cell system of claim 18, wherein the one or more oxidant reduction electrode modules comprises two oxidant reduction electrode modules configured to surround the one or more fuel electrodes, the two oxidant reduction electrode modules positioned opposite each other such that the oxidant reduction electrode of each of the two oxidant reduction electrode modules face one another, and surround the one or more fuel electrodes.

20. The electrochemical cell system of claim 19, wherein the one or more fuel electrodes comprises a single fuel electrode, common to each oxidant reduction electrode of the two oxidant reduction electrode modules.

21. A method of assembling an oxidant reduction electrode module configured for coupling to a cell cover and immersion into an ionically conductive medium of an electrochemical cell, the method comprising:

providing a housing, an interior of which defines a gaseous oxidant space therein;
mounting an oxidant reduction electrode to the housing, such that an oxidant facing side of the oxidant reduction electrode faces inwardly into the gaseous oxidant space and defines a boundary wall for the gaseous oxidant space, and such that an ionically conductive medium facing side of the oxidant reduction electrode faces outwardly for exposure to the ionically conductive medium when the oxidant reduction electrode module is immersed therein;
providing a gaseous oxidant inlet and a gaseous oxidant outlet in communication with the gaseous oxidant space;
providing an electrical conductor provided in a conductor channel, in or a gaseous inlet or outlet, and electrically connected to the oxidant reduction electrode; and
wherein the gaseous oxidant inlet is configured to allow an oxidant into the gaseous oxidant space, the oxidant reduction electrode is configured to absorb the gaseous oxidant via the oxidant facing side and reduce the gaseous oxidant during discharge of the electrochemical cell, and
wherein the electrical conductor enables establishment of an electrical connection of the oxidant reduction electrode with circuitry in the cell cover.

22. The method of claim 21, wherein the electrical conductor is provided in a conductor channel that extends upwardly from the top of the housing and is connectable to a connector provided on the cell cover.

23. The method of claim 21, further comprising providing one or more support members positioned within the gaseous oxidant space and configured to prevent deformation of the oxidant reduction electrode into the gaseous oxidant space when the oxidant reduction electrode is immersed into the ionically conductive medium.

* * * * *